(12) United States Patent
Hiroi

(10) Patent No.: US 11,681,049 B2
(45) Date of Patent: Jun. 20, 2023

(54) MOBILE BODY CONTROL SYSTEM, MOBILE BODY CONTROL DEVICE, MOBILE BODY CONTROL METHOD, AND RECORDING MEDIUM

(71) Applicant: NEC Corporation, Tokyo (JP)

(72) Inventor: Noriyoshi Hiroi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 920 days.

(21) Appl. No.: 16/476,324

(22) PCT Filed: Jan. 17, 2018

(86) PCT No.: PCT/JP2018/001159
§ 371 (c)(1),
(2) Date: Jul. 8, 2019

(87) PCT Pub. No.: WO2018/135522
PCT Pub. Date: Jul. 26, 2018

(65) Prior Publication Data
US 2019/0353794 A1 Nov. 21, 2019

(30) Foreign Application Priority Data
Jan. 19, 2017 (JP) .................................. 2017-007611

(51) Int. Cl.
*G01S 19/01* (2010.01)
*B64C 39/02* (2023.01)
*F41H 11/02* (2006.01)

(52) U.S. Cl.
CPC .......... *G01S 19/015* (2013.01); *B64C 39/024* (2013.01); *B64U 2201/104* (2023.01); *F41H 11/02* (2013.01)

(58) Field of Classification Search
CPC ................ G01S 19/015; B64C 39/024; B64C 2201/145; F41H 11/02
See application file for complete search history.

(56) References Cited

U.S. PATENT DOCUMENTS 7,952,519 B1   5/2011 Nielsen et al.
8,514,078 B2   8/2013 Lax et al.
(Continued)

FOREIGN PATENT DOCUMENTS

DE   102015008256 A1      12/2016
DE   102015008256 A1 *   12/2016 ........... B64C 39/024
(Continued)

OTHER PUBLICATIONS

US 2001/0048385 A1, 12/2001, Riemschneider et al. (withdrawn)
(Continued)

*Primary Examiner* — Erin F Heard
*Assistant Examiner* — Hailey R Le
(74) *Attorney, Agent, or Firm* — Sughrue Mion, PLLC

(57) ABSTRACT

Provided is a technique capable of moving a mobile body to an appropriate position and eliminating the mobile body. This mobile body control system is provided with: a false signal generation unit that generates a false signal for calculating a position different from the actual position of the mobile body on the basis of signal code information which the mobile body has received to calculate the position thereof; and a false signal transmission unit that transmits the generated false signal into a prescribed region.

15 Claims, 21 Drawing Sheets

(56) References Cited

U.S. PATENT DOCUMENTS

| | | | |
|---|---|---|---|
| 2006/0071852 A1 | 4/2006 | Akano | |
| 2008/0190274 A1 | 8/2008 | Kirkpatrick | |
| 2013/0099968 A1 | 4/2013 | Katz | |
| 2016/0196756 A1 | 7/2016 | Prakash et al. | |
| 2016/0223678 A1* | 8/2016 | Kim | G01S 19/215 |
| 2017/0024500 A1 | 1/2017 | Sebastian et al. | |
| 2017/0192089 A1* | 7/2017 | Parker | F41H 11/02 |
| 2018/0068570 A1 | 3/2018 | Gupta et al. | |
| 2019/0250641 A1 | 8/2019 | Beer et al. | |
| 2020/0264293 A1* | 8/2020 | Parker | G08G 5/0026 |

FOREIGN PATENT DOCUMENTS

| | | | | |
|---|---|---|---|---|
| JP | H03-117899 A | | 5/1991 | |
| JP | 2001-280997 A | | 10/2001 | |
| JP | 2001280997 | * | 10/2001 | G01C 21/16 |
| JP | 2005-178558 A | | 7/2005 | |
| JP | 2005178558 | * | 7/2005 | B64C 13/20 |
| JP | 2007-232688 A | | 9/2007 | |
| JP | 2007-322107 A | | 12/2007 | |
| JP | 2009-222394 A | | 10/2009 | |
| JP | 2010-014483 A | | 1/2010 | |
| JP | 2010014483 | * | 1/2010 | G01S 13/88 |
| JP | 2018-021865 A | | 2/2018 | |
| KR | 101494654 B1 | | 2/2015 | |
| KR | 101827344 B1 | * | 2/2018 | G01S 19/015 |
| WO | 2006/126358 A1 | | 11/2006 | |
| WO | 2017/134797 A1 | | 8/2017 | |

OTHER PUBLICATIONS

M. Psiaki and T. Humphreys, "GNSS Spoofing and Detection", Proc. IEEE, vol. 104, No. 6, pp. 1258-1270, Jun. 2016 (Year: 2016).*

Seong-Hun Seo, Byung-Hyun Lee, Sung-Hyuck Im, and Gyu-In Jee. "Effect of spoofing on unmanned aerial vehicle using counterfeited GPS signal". Journal of Positioning, Navigation, and Timing, 2015 (Year: 2015).*

U.S. Office Action for U.S. Appl. No. 16/601,952 dated Jan. 8, 2021.

International Search Report for PCT Application No. PCT/JP2018/001159, dated Apr. 17, 2018.

English translation of Written opinion for PCT Application No. PCT/JP2018/001159.

U.S. Office Action and PTO-892 for U.S. Appl. No. 16/601,952 dated Aug. 10, 2021.

U.S. Office Action and PTO-892 for U.S. Appl. No. 16/601,952 dated Mar. 17, 2022.

* cited by examiner

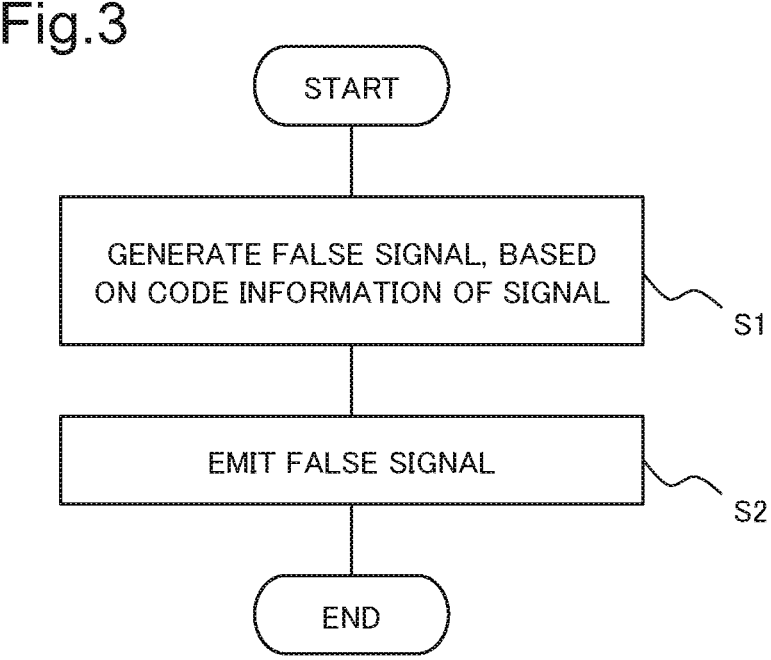
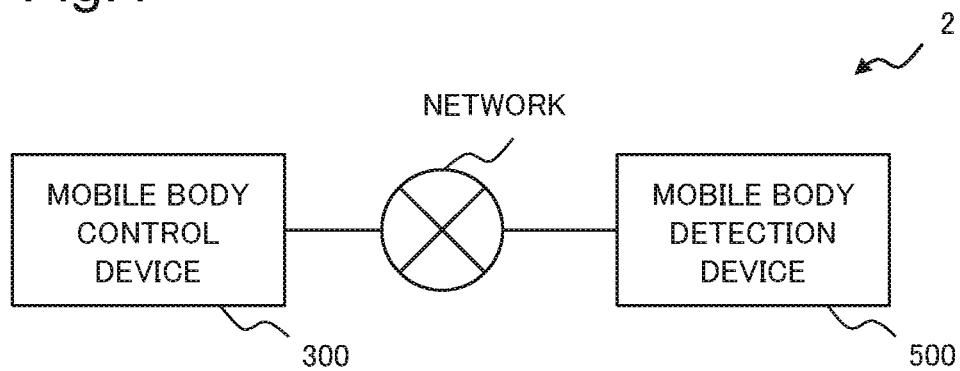

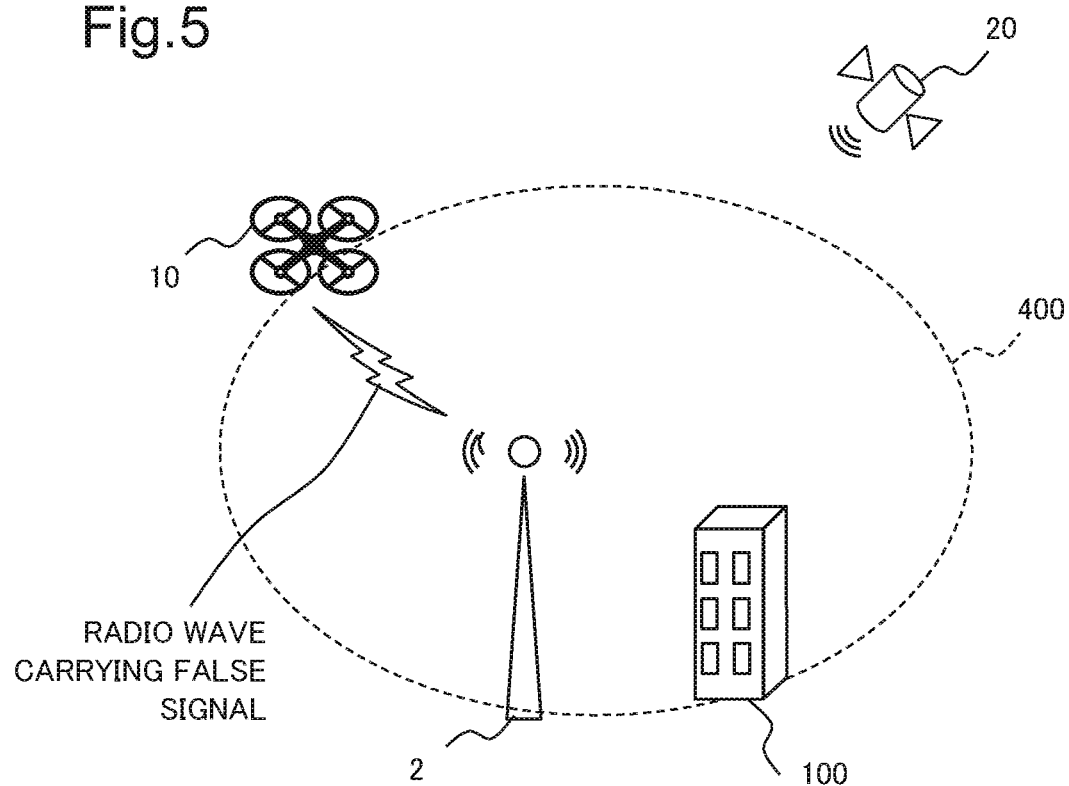

MOBILE BODY CONTROL SYSTEM, MOBILE BODY CONTROL DEVICE, MOBILE BODY CONTROL METHOD, AND RECORDING MEDIUM

This application is a National Stage Entry of PCT/JP2018/001159 filed on Jan. 17, 2018, which claims priority from Japanese Patent Application 2017-007611 filed on Jan. 19, 2017, the contents of all of which are incorporated herein by reference, in their entirety.

TECHNICAL FIELD

The present invention relates to a mobile body control system, a mobile body control device, a mobile body control method, and a recording medium.

BACKGROUND ART

Along with spread of an unmanned aerial vehicle (hereinafter abbreviated as a UAV) such as a multi-copter, a drone, a conventional radio-controlled helicopter, a radio-controlled plane, or a radio-controlled airship, there are concerns about crash of the UAV, invasion of privacy by aerial photography using an installed camera, occurrence of terrorism using the UAV mounted with a dangerous object, and the like. Thus, it is desired to safely eliminate such a UAV from the periphery of an important facility or the like in particular. However, the UAV moves in the sky at a high speed, and is therefore difficult to find or eliminate it. Moreover, since the UAV is capable of wireless remote manipulation or automatic flight according to a predetermined map coordinate, it is difficult for the third party to find a manipulator or an owner (hereinafter, referred to as a user).

As a method of eliminating a flying body by a mobile device to be defended, for example, PTL 1 describes a method of causing a guidance position of a flying body to be wrongly recognized by laser light radiated from a mobile device.

Furthermore, as a method of eliminating a missile traveling toward an object target, for example, PTL 2 describes a method of causing a guidance position of a missile to be wrongly recognized by an infrared signal or flare.

Still further, for example, PTL 3 describes that a deception signal of a global positioning system (GPS) is output in order to deteriorate guidance performance of a mobile body.

Still further, for example, PTL 4 describes a method of performing flying control of a missile in order to shoot down a mobile body.

Still further, PTL 5 describes a parking prohibited area notification device which detects a vehicle speed of a vehicle entering a parking prohibited area from an output of a GPS receiver, and performs notification of a parking prohibited area when a vehicle speed is less than a predetermined vehicle speed.

CITATION LIST

Patent Literature

[PTL 1] Japanese Unexamined Patent Application Publication No. 2007-322107
[PTL 2] Specification of U.S. Unexamined Patent Application Publication No. 2008/0190274
[PTL 3] Japanese Unexamined Patent Application Publication No. 2007-232688
[PTL 4] Japanese Unexamined Patent Application Publication No. H03-117899
[PTL 5] Japanese Unexamined Patent Application Publication No. 2009-222394

SUMMARY OF INVENTION

Technical Problem

In a case of techniques using laser light, the infrared signal, or flare disclosed in PTLs 1 and 2, the flying body or the missile directly confirms unencoded optical information such as reflected light emitted by the mobile device to be defended, or heat information emitted by the object target, and is guided. Therefore, the laser light, the infrared signal, or the flare emitted by the device which causes the optical information to be wrongly recognized also becomes unencoded direct optical information. In other words, when an obstacle exists on a way or when a propagation distance is a long distance, optical information is unreachable, and therefore, it is not possible to cause optical information to be wrongly recognized. Moreover, the optical information is not encoded. Thus, with the techniques in PTLs 1 and 2, it is not possible to cause information resulting from an encoded guiding radio wave such as GPS information to be wrongly recognized, and it may not be possible to safely eliminate the flying body from the periphery of an important facility or the like.

Furthermore, in a technique disclosed in PTL 3, encoding of the deception signal is not considered, and therefore, it may not be possible to guide the mobile body to a predetermined position due to the deception signal. Therefore, with the technique disclosed in PTL 3, it may not be possible to appropriately eliminate the mobile body from the periphery of an important facility or the like.

Still further, with a technique disclosed in PTL 4, a mobile body is eliminated on a way to fly toward a target, and a place of elimination is not necessarily an appropriate place. Therefore, with the technique disclosed in PTL 4, it may not be possible to safely eliminate a target machine.

Still further, with a technique disclosed in PTL 5, a device is attached to a mobile body (vehicle), and a side which wishes to eliminate the mobile body is unable to eliminate the mobile body at a given time and place.

The present invention has been made in view of the above-described problem, and an object of the present invention is to provide a technique causing an opposing mobile body, not directly controlled, to move to an appropriate position, such that the opposing mobile body can be kept away from a predetermined area.

Solution to Problem

An aspect of the present invention is a mobile body control system. The mobile body control system includes false signal generating means for generating, based on code information of a signal received by a mobile body in order to calculate a position of the mobile body, a false signal with which a position being different from an actual position of the mobile body is calculated, and false signal emission means for emitting the generated false signal into a predetermined region.

Another aspect of the present invention is a mobile body control device. The mobile body control device includes movement controller for moving in such a way as to be located within a predetermined range from a mobile body where the mobile body receives a signal serving to calculate a position of the mobile body, and false signal emission means for emitting a false signal which is generated based on code information of the signal received by the mobile body, and with which a position being different from an actual position of the mobile body is calculated, into a region where the mobile body can receive the false signal.

Another aspect of the present invention is a mobile body control method. The mobile body control method includes generating, based on code information of a signal received by a mobile body in order to calculate a position of the mobile body, a false signal with which a position being different from the actual position of the mobile body is calculated, and emitting the generated false signal into a predetermined region.

Another aspect of the present invention is a mobile body control method. The mobile body control method includes moving in such a way as to be located within a predetermined range from a mobile body where the mobile body receives a signal serving to calculate a position of the mobile body, and emitting a false signal which is generated based on code information of the signal received by the mobile body, and with which a position being different from an actual position of the mobile body is calculated, into a region where the mobile body can receive the false signal.

Note that, a computer program which implements the above-described mobile body control system or mobile body control method by a computer, and a computer-readable non-transitory recording medium storing the computer program also fall within the scope of the present invention.

Advantageous Effects of Invention

It is possible to move the mobile body, to an appropriate position, such that the mobile body can be kept away from a predetermined area.

BRIEF DESCRIPTION OF DRAWINGS

FIG. 3 is a flowchart illustrating one example of operation flow of the mobile body control system according to the first example embodiment.

FIG. 4 is a diagram illustrating one example of an overall configuration of a mobile body control system according to a second example embodiment.

FIG. 5 is a diagram for describing an application example of the mobile body control system according to the second example embodiment.

EXAMPLE EMBODIMENT

First Example Embodiment

Figure 1:
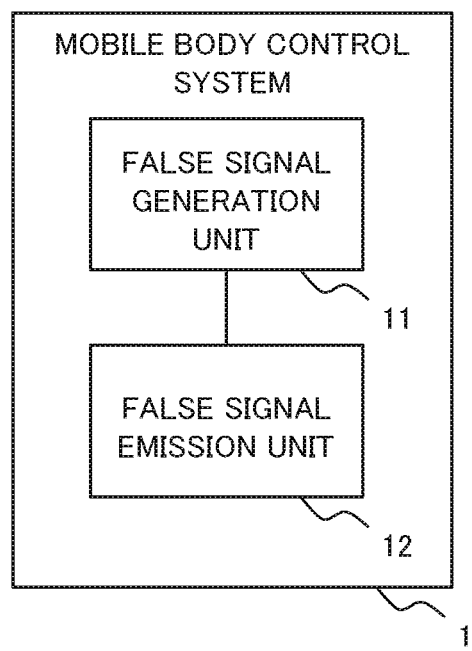
FIG. 1 is a functional block diagram illustrating one example of a functional configuration of a mobile body control system according to a first example embodiment.
Figure 2:
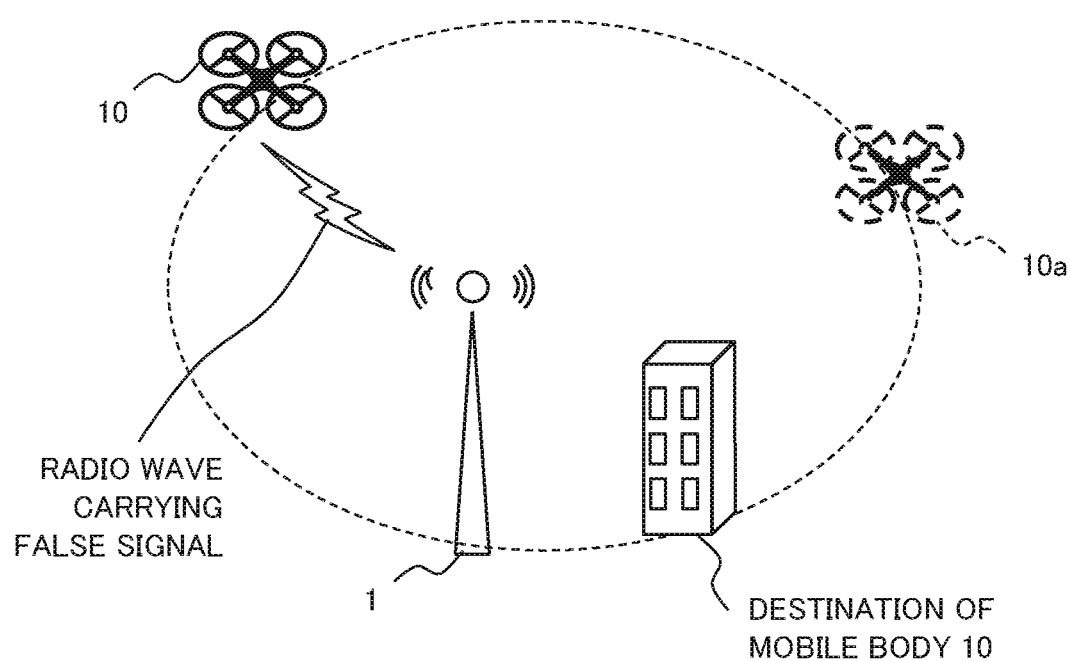
FIG. 2 is a diagram for describing an application example of the mobile body control system according to the first example embodiment.

A first example embodiment is described in detail with reference to the drawings. FIG. 1 is a functional block diagram illustrating one example of a functional configuration of a mobile body control system 1 according to the present example embodiment. Further, FIG. 2 is a diagram for describing an application example of the mobile body control system 1 according to the present example embodiment. An opposing UAV (mobile body) 10 receives, for example, a signal for self position calculation by a satellite navigation system or the like, in order to calculate a position of the opposing UAV 10. The mobile body control system 1 causes the opposing UAV 10 to receive a false signal for self position calculation, and causes the opposing UAV 10 to calculate the position being different from an actual position of the opposing UAV 10. In this way, the mobile body control system 1 causes, for example, the opposing UAV 10 entering a predetermined region to receive a radio wave carrying a false or dummy signal generated based on code information of the signal for the self position calculation, and thereby controls the opposing UAV 10 such that the opposing UAV 10 can be eliminated from the predetermined region.

Herein, an opposing UAV 10 is described. Originally, the opposing UAV 10 is a UAV the flight route of which is controlled by a control system being different from a mobile body control system disclosed by the present invention. A control system of the opposing UAV 10 may be incorporated in the opposing UAV 10, or may be present outside. Alternatively, a plurality of control systems may be combined.

A configuration of the mobile body control system 1 is described. As illustrated in FIG. 1, the mobile body control system 1 includes a false signal generation unit (false signal generator) 11 and a false signal emission unit (false signal transmitter) 12.

Based on the code information of the signal received by the opposing UAV 10, the false signal generation unit 11 generates the false signal with which the position being different from the actual position of the opposing UAV 10 is calculated. Then, the false signal generation unit 11 supplies the generated false signal to the false signal emission unit 12.

The false signal emission unit 12 receives the false signal from the false signal generation unit 11. The false signal emission unit 12 emits the false signal generated by the false signal generation unit 11 into a predetermined region on a radio wave.

FIG. 3 is a flowchart illustrating one example of operation flow of the mobile body control system 1 according to the present example embodiment. First, the false signal generation unit 11 generates the false signal, based on the code information of the signal received by the opposing UAV 10 (step S1). Then, the false signal emission unit 12 emits the false signal generated in step S1 into a predetermined region on a radio wave (step S2).

Thus, the mobile body control system 1 according to the present example embodiment can cause the opposing UAV 10 in a predetermined region (e.g., in an ellipse indicated by a dotted line in FIG. 2) to receive a radio wave carrying the false signal generated by the false signal generation unit 11. The opposing UAV 10 has a configuration for receiving the signal for the self position calculation in order to calculate the position of the opposing UAV 10. Moreover, the false signal is generated based on the code information of the signal for the self position calculation, in such a way that the position of the opposing UAV 10 is calculated to be a position being different from the actual position. Therefore, when the opposing UAV 10 in the predetermined region receives a radio wave carrying the false signal, the opposing UAV 10 calculates the position of the opposing UAV 10 to be a position being different from the actual position, for example, the position of the opposing UAV 10 (denoted as 10*a*) indicated by a dotted line in FIG. 2.

Accordingly, although a destination of the opposing UAV 10 is in a lower right direction from the actual position in FIG. 2, the opposing UAV 10 acquires the destination with respect to 10*a*, and therefore recognizes that the destination is in a lower left direction. Thus, the opposing UAV 10 moves in the lower left direction from the actual position. Then, when moving away from a predetermined region, the opposing UAV 10 calculates the actual position, and recognizes that the destination is present in lower right. Therefore, the opposing UAV 10 again moves close to the predetermined region. However, when entering the predetermined region, the opposing UAV 10 repeatedly recognizes again that the destination is in a lower left direction.

Thus, the mobile body control system 1 according to the present example embodiment can prevent the opposing UAV 10 from approaching the destination. Further, the mobile body control system 1 can bring the opposing UAV 10 into such a state as being unable to move due to a dead battery of the opposing UAV 10, by causing the opposing UAV 10 to repeat the above-described operation. In other words, the opposing UAV 10 is eliminated without external direct control or physical interference. Therefore, the opposing UAV 10 can be appropriately eliminated by the mobile body control system 1 according to the present example embodiment.

Second Example Embodiment

A second example embodiment based on the above-described first example embodiment is described. FIG. 4 is a diagram illustrating one example of an overall configuration of a mobile body control system 2 according to the present example embodiment. As illustrated in FIG. 4, the mobile body control system 2 includes a mobile body control device 300. The mobile body control system 2 may further include a mobile body detection device 500. The mobile body control device 300 and the mobile body detection device 500 may be communicably connected to each other via a network. Moreover, the mobile body control device 300 may incorporate the mobile body detection device 500 as a detection unit.

FIG. 5 is a diagram for describing an application example of the mobile body control system 2 according to the present example embodiment.

An opposing UAV 10 is targeted for elimination by the present invention. For example, the opposing UAV 10 is a hobby or industrial UAV which is not permitted to fly in a certain region. Alternatively, the opposing UAV 10 is a UAV being against the law. Alternatively, the opposing UAV 10 also includes the opposing UAV 10 which, even when the opposing UAV 10 has acquired permission from a landowner or the like, there is a person who wishes to eliminate the opposing UAV 10 in the region. For example, a user using the opposing UAV 10 in a park or the like has acquired permission from a park management office or the like of the park, but another user (such as a parent with an infant) of the park feels uncomfortable with flight of the opposing UAV 10 in terms of safety. A UAV in this case may also be the opposing UAV 10. Moreover, the opposing UAV 10 is, for example, a UAV the flight if which is permitted, but which is not permitted with regard to other actions using a UAV, such as photography, surveying, inspection, and throwing of a projectile. For example, an adjacent building is photographed by a UAV-attached camera from the sky above a private land where a flight permission is acquired, without permission of an owner or a resident of the building. A UAV in this case (invasion of privacy) may also be the opposing UAV 10.

In the present example embodiment, a description is given assuming that the opposing UAV 10 is a device which performs autonomous flight (automatic flight) according to a predetermined map coordinate. Note that a case where the opposing UAV 10 is remotely operated is described in another example embodiment.

Such an opposing UAV 10 receives a radio wave with which a position of the opposing UAV 10 can be calculated from an artificial satellite 20. The artificial satellite 20 is, for example, an artificial satellite in a global positioning system (GPS), a global navigation satellite system (GLONASS), or a quasi-zenith satellite system (QZSS). The opposing UAV 10 may receive, for example, an error correction signal from a ground base station or the like by a differential GPS (DGPS) or the like. Note that each of these systems is hereinafter described as a GPS in the present invention.

Furthermore, the opposing UAV 10 may receive a radio wave which is not from the artificial satellite 20, but is used by, for example, an indoor GPS or a positioning system utilizing wireless positioning or positioning by a total station, an image system, or the like.

The opposing UAV 10 receives one or a plurality of kinds of above-described radio waves, and calculates the position of the opposing UAV 10 at present, based on the code information of the received radio wave. Then, the opposing UAV 10 compares a predetermined destination or passing point (way point) with the calculated position of the opposing UAV 10 at present, and moves toward the destination. The opposing UAV 10 moves toward the destination while correcting the position at present at a predetermined timing.

A position or building being a target to be protected from the opposing UAV 10 is hereinafter referred to as an important facility 100. In such a case, the mobile body detection device 500 of the mobile body control system 2 detects the opposing UAV 10 entering a predetermined region. For example, the mobile body detection device 500 may detect the opposing UAV 10 by use of a radar, or may detect the opposing UAV 10 by use of a detection method by sound. Further, the mobile body detection device 500 may detect the opposing UAV 10 through photography by visible light or infrared light. Further, the mobile body detection device 500 may detect the opposing UAV 10 by accepting a notification indicating that a mobile body is visually detected. Further, the mobile body detection device 500 may detect the opposing UAV 10 by combining these detection methods. A method by which the mobile body detection device 500 detects the opposing UAV 10 may use an existing technique, and is not particularly limited. When detecting the opposing UAV 10, the mobile body detection device 500 transmits, to the mobile body control device 300, a notification (detection notification) indicating that the opposing UAV 10 is detected.

Then, the mobile body control device 300 of the mobile body control system 2 emits a false signal on a radio wave to the opposing UAV 10 in a predetermined region. The predetermined region is, for example, a region around an important facility 100, and is a region where a radio wave carrying the false signal can be received. Hereinafter, the predetermined region is referred to as an emission region 400. The mobile body control device 300 emits a radio wave carrying the false signal to the opposing UAV 10 in the emission region 400 in such a way as to cause the opposing UAV 10 to receive the radio wave carrying the false signal. Thus, the opposing UAV 10 calculates a position being different from the actual position to be the position of the opposing UAV 10. Note that the emission region 400 may be the same as or different from a region where the mobile body detection device 500 can detect that the opposing UAV 10 exists in the predetermined region.

Furthermore, a predetermined region may include a region targeted for protection (e.g., a region including the important facility 100), or may be a peripheral region of a region targeted for protection. In other words, a predetermined region needs only to be a region set in such a way that the opposing UAV 10 does not enter a region targeted for protection. Therefore, it can be said that the opposing UAV 10 eliminated from a predetermined region is also eliminated from a region targeted for protection.

Note that, a description is given in the present example embodiment and later-described other example embodiments assuming that the opposing UAV 10 is a flying body, but may be, for example, the following mobile body.

An automobile being capable of automatic driving, or

An unmanned ground vehicle (UGV), an unmanned surface vehicle (USV), or an unmanned underwater vehicle (UUV) being capable of automatic driving.

Figure 6:
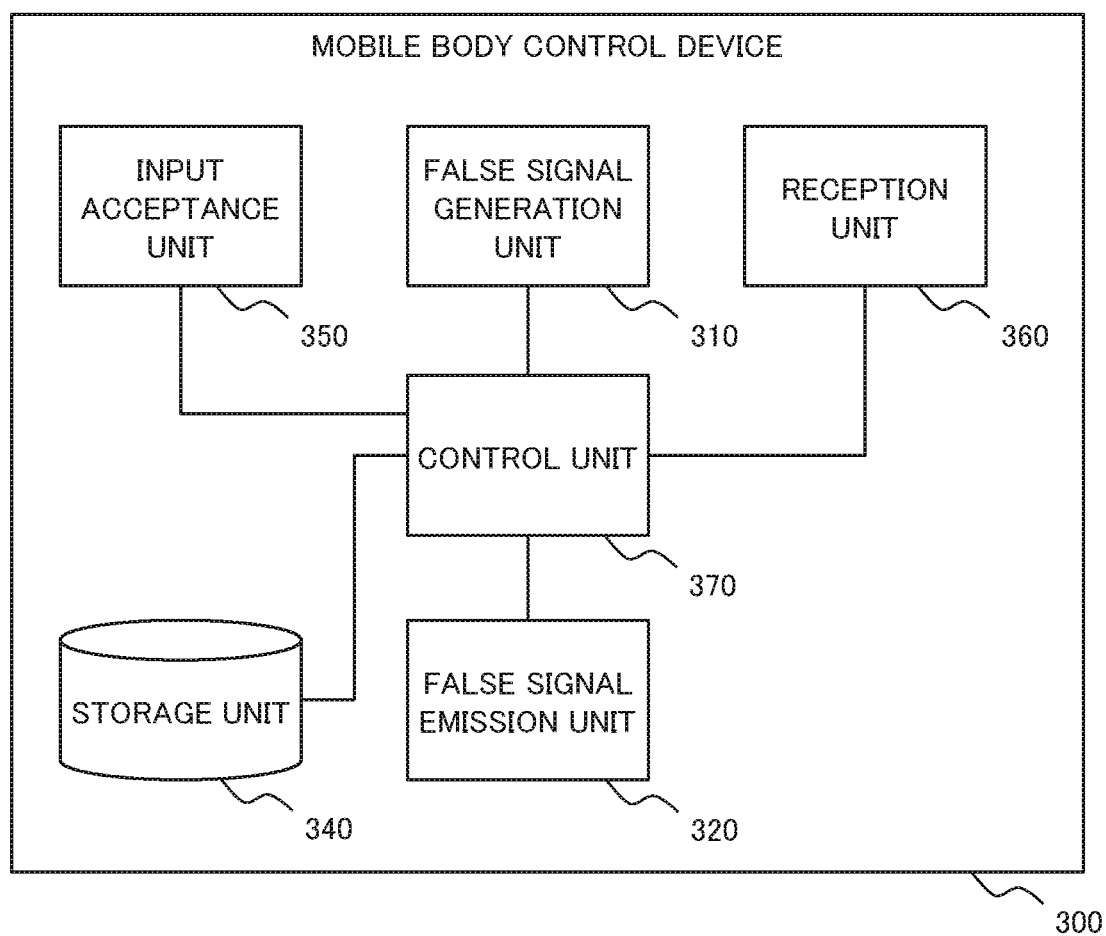
FIG. 6 is a functional block diagram illustrating one example of a functional configuration of a mobile body control device in the mobile body control system according to the second example embodiment.

FIG. 6 is a functional block diagram illustrating one example of a functional configuration of the mobile body control device 300 in the mobile body control system 2 according to the present example embodiment. As illustrated in FIG. 6, the mobile body control device 300 includes a false signal generation unit 310 and a false signal emission unit 320. The mobile body control device 300 further includes a storage unit 340, an input acceptance unit 350, a reception unit 360, and a control unit (controller) 370.

The false signal generation unit 310 and the false signal emission unit 320 are equivalent to the false signal generation unit 11 and the false signal emission unit 12 in the above-described first example embodiment, respectively.

Herein, a radio wave received by the opposing UAV 10 is described. When an artificial satellite 20 is a GPS satellite, a signal is transmitted on a radio wave from each of a plurality of artificial satellites 20. The signal includes orbit information (position information) of the artificial satellite 20, current time information representing an exact current time, and orbit information (moving route information) of the artificial satellite. The opposing UAV 10 is an instrument being capable of receiving a radio wave including such a signal. A time received by a receiving side is a time delayed according to a distance between a transmission side (artificial satellite 20) and the receiving side (e.g., the mobile body control device 300 or the opposing UAV 10). Therefore, the distance between the transmission and the reception is known by the delayed time (delay amount) and orbit information. Moreover, by receiving radio waves of signals including similar information from a plurality of artificial satellites 20, the receiving side becomes able to acquire the position at present by a distance to each of a plurality of artificial satellites 20 and orbit information. The receiving side can acquire a coordinate on a ground level by signals from three artificial satellites 20, and can also acquire an altitude by signals from four artificial satellites 20. Moreover, when receiving signals from five or more artificial satellites 20, the receiving side can highly accurately calculate the position of the opposing UAV 10 by integrating a plurality of coordinates acquired from respective signal pairs.

The opposing UAV 10 performing automatic flight calculates the position of the opposing UAV 10 by receiving such a radio wave, and moves to a destination position. Therefore, in order to cause the opposing UAV 10 to receive a radio wave carrying a false signal, the mobile body control device 300 estimates the code information of the signal included in a radio wave received by the opposing UAV 10, and generates the false signal according to the code information.

The reception unit 360 receives a plurality of radio waves transmitted from a plurality of artificial satellites 20. The reception unit 360 measures intensity (radio wave intensity) of the radio wave received at this time. The reception unit 360 analyzes the code information of the signal included in the received radio wave. Then, the reception unit 360 supplies, to the control unit 370, a result (code information analysis result) of analyzing the code information, and the radio wave intensity.

The storage unit 340 stores information (e.g., an encoding scheme and the like) for generating the false signal. Moreover, the storage unit 340 may store a position of the important facility 100, or map information including the important facility 100. Then, map information may previously store a position suited to move the opposing UAV 10, or a movement priority order.

The control unit 370 receives a detection notification output from the mobile body detection device 500.

Furthermore, the control unit 370 determines an elimination position and an elimination direction of the opposing UAV 10, based on an instruction content from the input acceptance unit 350, information on the opposing UAV 10 from the mobile body detection device 500, the code information analysis result from the reception unit 360, and information on the storage unit 340. Specifically, the control unit 370 determines a false current position transmitted to the opposing UAV 10, based on the position of the important facility 100. Alternatively, the control unit 370 may indicate a candidate of a false current position to the input acceptance unit 350, and receive a selection result from the input acceptance unit 350. Moreover, the control unit 370 may automatically determine a false current position, based on map information stored in the storage unit 340. Then, the control unit 370 transmits, to the false signal generation unit 310, a false current position to be transmitted to the opposing UAV 10.

The false signal generation unit 310 receives a result of analyzing the code information of the signal included in each of a plurality of radio waves from the reception unit 360 via the control unit 370, and information on a false current position. Then, the false signal generation unit 310 estimates, with reference to the storage unit 340, a signal of the same code information as that of the signal included in the radio wave received by the reception unit 360, and generates a plurality of false signals. Each of the false signals is such that the opposing UAV 10 calculates a position being different from the actual position when receiving the false signal. Specifically, each of the false signals is a false signal in which orbit information, a transmission time, or both of them are changed in an original signal according to the analyzed code information.

When the reception unit 360 receives a radio wave, an opposing UAV can also receive the radio wave, and is therefore estimated to also receive a similar radio wave. Herein, the false signal generation unit 310 generates a false signal, based on the code information of the signal included in a radio wave receivable at present, for a reason that a content of the signal is desirably successive. This is because, in calculation of a coordinate using a radio wave, a coordinate is not calculated at an instant of each of received signals, but is calculated with reference to past development. For example, it is not possible to perform calculation without a certain amount of stored data when a coordinate is suddenly given at a time of antenna activation or the like. It is not always possible to receive the radio wave in an intended state due to a failure of an artificial satellite 20, fluctuation of an atmospheric state, and the like. Therefore, in consideration of the above-described influence, the false signal generation unit 310 generates the false signal after actually receiving a radio wave. Thus, for example, even when a failure or the like of an artificial satellite 20 is occurring, the false signal generation unit 310 can generate such a signal having a successive content that the opposing UAV 10 does not recognize the signal as the false signal. Note that, when these influences are negligible, the false signal generation unit 310 may generate the false signal without receiving radio wave at present (i.e., the reception unit 360 does not receive a radio wave).

Furthermore, as described above, since a radio wave is transmitted from each of a plurality of artificial satellites 20, it is considered that the opposing UAV 10 receives a plurality of radio waves. Therefore, the false signal generation unit 310 generates the false signal associated with each of a plurality of radio waves received by the reception unit 360.

The false signal generation unit 310 supplies the generated false signal to the false signal emission unit 320.

The false signal emission unit 320 receives the false signal from the false signal generation unit 310. The false signal emission unit 320 emits the false signal into the emission region 400 on a radio wave. Note that the false signal has a same frequency as that of a radio wave received by the reception unit 360, but is different in content. As one example of a method of causing the opposing UAV 10 to wrongly recognize that a radio wave carrying the false signal is a same radio wave as a radio wave received by the reception unit 360, the false signal emission unit 320 outputs a radio wave having higher intensity than a radio wave received by the reception unit 360. In this instance, the false signal emission unit 320 refers to radio wave intensity supplied from the reception unit 360, and emits the false signal having higher intensity on a radio wave. Thus, the opposing UAV 10 also receives, together with a radio wave emitted from an artificial satellite 20, a radio wave carrying the false signal being higher in intensity than the radio wave emitted from the artificial satellite 20, and then wrongly recognizes that the false signal having higher intensity is a radio wave emitted from the artificial satellite 20. This is because the opposing UAV 10 normally does not hold information on intensity of a radio wave emitted from an artificial satellite 20.

The false signal emission unit 320 is implemented by, for example, an amplifier, an antenna, and the like. Since an artificial satellite 20 is generally passing on an inherent orbit, a direction of each of a plurality of radio waves received by the opposing UAV 10 varies when seen from the opposing UAV 10. Thus, a general antenna used for positioning, such as a GPS antenna, often does not detect a direction of a radio wave. Therefore, the false signal emission unit 320 may emit, from one antenna, a plurality of radio waves carrying false signals associated with respective radio waves emitted by a plurality of artificial satellites 20. Note that the false signal emission unit 320 may emit a plurality of radio waves carrying the false signals by use of a plurality of antennas. Moreover, the false signal emission unit 320 may emit various combinations of radio waves. For example, the false signal emission unit 320 may emit at least some of a plurality of radio waves carrying the false signals by use of one antenna, and emit remaining radio waves carrying the false signals by use of another antenna.

The input acceptance unit 350 accepts an input from, for example, a manager of the mobile body control device 300. For example, the input acceptance unit 350 accepts an input of the position calculated by use of the false signal generated by the false signal generation unit 310. The input acceptance unit 350 outputs an accepted input content to the false signal generation unit 310. The input acceptance unit 350 is implemented by, for example, an input device such as a console.

Note that there may be one or a plurality of reception units 360 and one or a plurality of mobile body detection devices 500.

Figure 7:
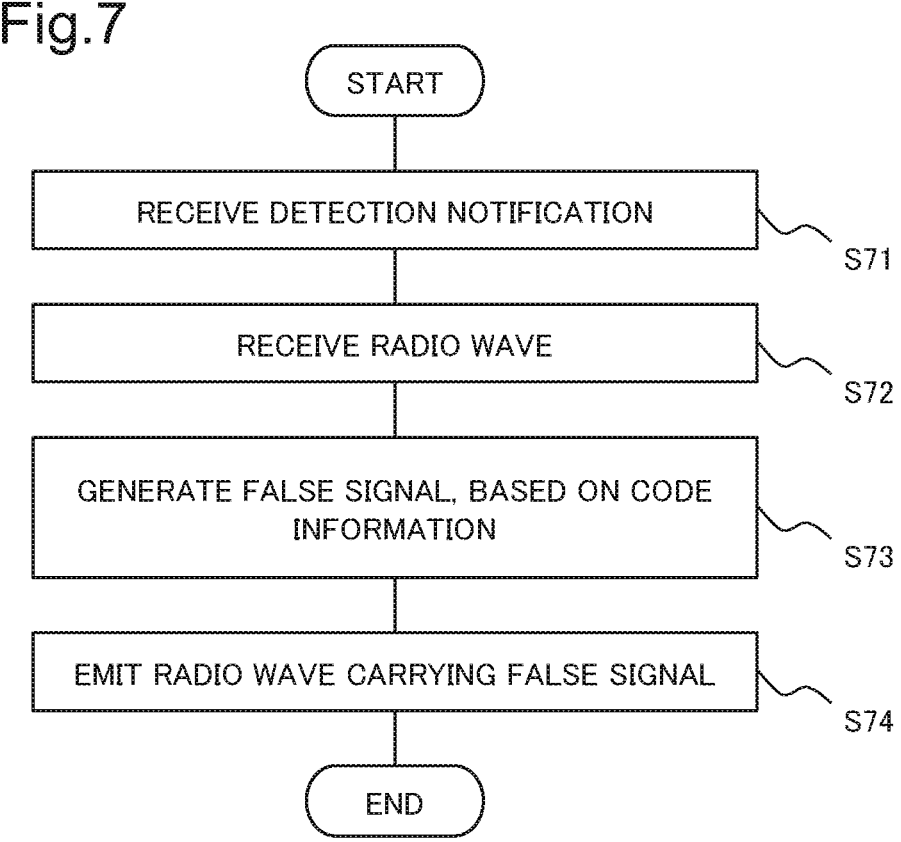
FIG. 7 is a flowchart illustrating one example of operation flow of the mobile body control device in the mobile body control system according to the second example embodiment.

Next, operation flow of the mobile body control device 300 in the present example embodiment is described with reference to FIG. 7. FIG. 7 is a flowchart illustrating one example of operation flow of the mobile body control device 300 in the mobile body control system 2 according to the present example embodiment. In FIG. 7, a description is given assuming that the opposing UAV 10 enters the emission region 400, and the mobile body detection device 500 detects that the opposing UAV 10 exists in the emission region 400.

The reception unit 360 of the mobile body control device 300 receives a detection notification output from the mobile body detection device 500 (step S71). Then, the reception unit 360 receives a radio wave serving to calculate the position and being receivable at present (step S72). Then, the reception unit 360 supplies the received radio wave to the false signal generation unit 310.

Then, the false signal generation unit 310 estimates, based on the radio wave received by the reception unit 360, the code information of the signal included in the radio wave, and generates, based on the estimated code information, a false signal with which a position being different from the actual position of the opposing UAV 10 is calculated (step S73). As described above, a radio wave received by the reception unit 360 is estimated to be radio wave received by the opposing UAV 10. In other words, based on the code information of the signal included in a radio wave received by the opposing UAV 10, the reception unit 360 generates the false signal with which the position being different from the actual position of the opposing UAV 10 is calculated. Note that, in step S73, the false signal generation unit 310 may further generate the false signal, based on an instruction accepted by the input acceptance unit 350. For example, when the above-described instruction is an instruction to designate a false position, the false signal generation unit 310 may generate such a false signal that a designated false position is calculated. Then, the false signal generation unit 310 supplies the generated false signal to the false signal emission unit 320.

Note that a current position of the opposing UAV 10 calculated by use of the false signal generated by the false signal generation unit 310 is a position being different from the actual position of the opposing UAV 10. Hereinafter, the position calculated by the false signal and being different from the actual position of the opposing UAV 10 is referred to as a false position.

The false signal emission unit 320 receives the false signal from the false signal generation unit 310. The false signal emission unit 320 emits, into the emission region 400, a radio wave carrying the received false signal (step S74).

Consequently, the mobile body control device 300 ends processing. Thereafter, the mobile body control device 300 starts processing in step S71 when a detection notification is output from the mobile body detection device 500. The mobile body control device 300 repeats processing in steps S71 to S74 until no more detection notifications are output from the mobile body detection device 500.

In step S74, by emission of a radio wave carrying the false signal into the emission region 400, the opposing UAV 10 in the emission region 400 can receive the radio wave carrying the false signal. When receiving a radio wave carrying the false signal, the opposing UAV 10 calculates a position of the opposing UAV 10 by use of the radio wave carrying the false signal. As described above, since the false signal is generated in such a way as to calculate a false position, the opposing UAV 10 wrongly calculates that the position of the opposing UAV 10 is a false position. Thus, the opposing UAV 10 determines that a current position of the opposing UAV 10 is a position being different from the actual position. Therefore, the opposing UAV 10 corrects a direction for moving to the destination, and starts moving in the corrected direction.

The opposing UAV 10 is generally mounted with a battery. The opposing UAV 10 has not arrived at the destination, and therefore repeats the above-described movement until the battery runs out. The opposing UAV 10 the battery of which has ran out lands or falls therearound. Thus, according to the mobile body control system 2 in the present example embodiment, the opposing UAV 10 is not able to come close to the important facility 100, and lands or falls near a certain spot. Therefore, the mobile body control system 2 can appropriately eliminate the opposing UAV 10.

Furthermore, it is assumed that, for example, the position calculated by the false signal generated by the false signal generation unit 310 in step S73 is a position of the important facility 100. When the destination of the opposing UAV 10 is also the important facility 100, the opposing UAV 10 calculates from the false signal included in a received radio wave that the position of the opposing UAV 10 is the destination. Thus, the opposing UAV 10 remains or lands at a position of the moment. Therefore, since the opposing UAV 10 does not come close to the important facility 100 being the destination, the mobile body control system 2 can eliminate the opposing UAV 10 from the periphery or the like of the important facility 100.

There is a case where a mobile body such as a UAV moves in the sky at a high speed, and is difficult to find and directly eliminate. Moreover, since such a mobile body is capable of a wireless remote operation, automatic flight according to a predetermined map coordinate, or the like, it is difficult for a third party to find a manipulator or an owner (hereinafter, referred to as an owner of the mobile body). Therefore, it is very difficult for a person having a possibility of being damaged by the mobile body to safely eliminate the mobile body by use of an operation device such as a controller which operates the mobile body.

Furthermore, the mobile body does not need a special place for takeoff, and therefore has a possibility of taking off from a place near the destination or a target person, and causing a problem to the destination or the target person. Therefore, even when an attempt is made to operate a control signal of the mobile body by an electronic means, a flight time of the mobile body becomes relatively short in such a case. When a flight time is short, an emission time of a control signal is also short, and therefore, a time for analyzing the control signal becomes less. Thus, in such a case, it is difficult to operate a control signal. Moreover, since there is a case where the mobile body is flying by automatic flight, it may not be possible to appropriately eliminate the mobile body by a method which operates a control signal.

Still further, with the above-described technique related to PTL 4, the mobile body is physically destroyed by a missile, shooting, laser light, or the like. In such a case, a destroyed mobile body drops to the ground, and therefore, there is a possibility that damage resulting from the dropped mobile body occurs. Moreover, there is a possibility that a bullet or the like which does not hit the mobile body causes secondary damage. When the mobile body is to be eliminated, there are many cases where a third party is present nearby, and therefore, the above-described technique related to PTL 4 is applicable only under a limited condition.

Still further, it is difficult to use such a technique related to PTL 4 near a private facility (such as an apartment) and a small-scale public facility (such as a park in a city) having a possibility of invasion of privacy. This is because there is a high possibility that secondary damage becomes greater. Thus, with the technique related to PTL 4, it is not possible to inexpensively eliminate the mobile body within the law.

Still further, when a technique related to PTL 5 is applied, all mobile bodies are obligated to be mounted with devices which automatically detect a flight prohibited area, but this method is not realistic. This is because mounting such a device is costly for an owner of the mobile body. Moreover, even when mounting of such a device is made obligatory by the law or the like, there is a high possibility that a person (regulating side) who wishes to eliminate the mobile body does not have power of execution. This is because, as described above, the mobile body is small-sized and difficult to find, and therefore cost required for regulation becomes high.

However, by the mobile body control system 2 according to the present example embodiment, the mobile body control device 300 emits a radio wave carrying the false signal. Thus, the opposing UAV 10 receiving the radio wave carrying the false signal is guided according to the position calculated by the false signal. For example, when a calculated position is the destination, the opposing UAV 10 lands or stays at the place. Thus, the mobile body control system 2 according to the present example embodiment does not perform elimination by physical destruction or the like of the opposing UAV 10. Therefore, the mobile body control system 2 can appropriately eliminate the opposing UAV 10 without causing secondary damage as described above.

By the mobile body control system 2 according to the present example embodiment, it is possible to eliminate the opposing UAV 10 without providing a device which physically destroys the opposing UAV 10. Moreover, by the mobile body control system 2 according to the present example embodiment, a function normally provided in the opposing UAV 10 is utilized, and, for example, such an additional function as in the technique related to PTL 5 is not mounted on the opposing UAV 10. Moreover, a device itself which generates the false signal is inexpensive. Therefore, the mobile body control system 2 according to the present example embodiment can hold down cost.

In the operation of the mobile body control system 2 according to the present example embodiment, at a moment when the opposing UAV 10 enters the emission region 400, the opposing UAV 10 is detected, and a radio wave carrying the false signal is emitted. However, the mobile body control device 300 may generate and emit the false signal without even detecting the opposing UAV 10. The false signal emission unit 320 may constantly keep emitting a radio wave carrying the false signal, or may emit a radio wave carrying the false signal at a predetermined timing. A timing at which the false signal emission unit 320 emits a radio wave carrying the false signal may be determined according to a surrounding environment of the mobile body control device 300, and a difficulty level of finding the opposing UAV 10. By generating the false signal and then emitting the false signal on a radio wave after the opposing UAV 10 is detected, the mobile body control system 2 can emit a radio wave carrying the false signal to a region where the opposing UAV 10 can receive the radio wave carrying the false signal. Therefore, the mobile body control system 2 can more appropriately eliminate the opposing UAV 10. Moreover, by generating the false signal after the opposing UAV 10 is detected, it is possible to generate the false signal according to the position where the opposing UAV 10 is detected. Thus, the mobile body control system 2 can more appropriately eliminate the opposing UAV 10.

Furthermore, the false signal generation unit 310 may generate, as the false signal, a jamming radio wave (i.e., noise) on a same frequency band as a radio wave received by the reception unit 360. Then, the false signal emission unit 320 may emit the jamming radio wave. The opposing UAV 10 in a predetermined region becomes unable to receive a radio wave from an artificial satellite 20. In many cases, the opposing UAV 10 attempts to stay where it is when a radio wave is interrupted. Therefore, even when a jamming radio wave is used as the false signal, the mobile body control system 2 can more appropriately eliminate the opposing UAV 10.

Note that the above-described mobile body control device 300 may be provided in a mobile object, or may be provided in a fixed device. For example, an airship or the like is cited as a mobile object, but a mobile object is not limited to this. An example of a case where the mobile body control device 300 is provided in an airship or the like is described. In this instance, the false signal emission unit 320 may be achieved by a directive antenna. Thus, the false signal emission unit 320 emits a radio wave carrying the false signal including directivity.

Figure 8:
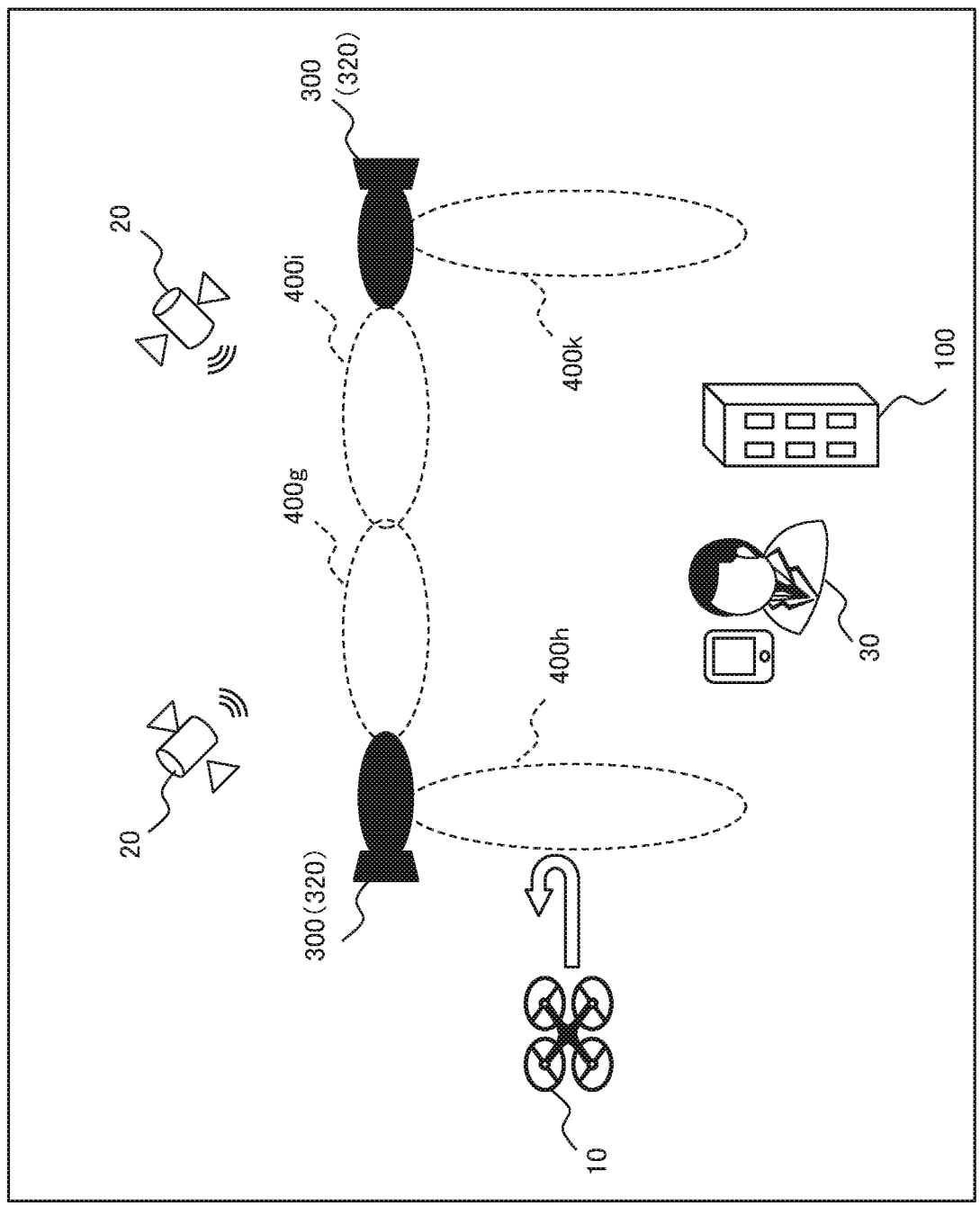
FIG. 8 is a diagram for describing emission of a radio wave carrying a false signal when a false signal emission unit is a directive antenna.

FIG. 8 is a diagram for describing emission of a radio wave carrying the false signal when the false signal emission unit 320 is a directive antenna. As illustrated in FIG. 8, the false signal emission unit 320 may emit a radio wave carrying the false signal to a space where entry of the opposing UAV 10 is predicted, in the above-described step S74. For example, the false signal emission unit 320 may emit a signal in a vertical direction and a horizontal direction from the mobile body control device 300. Examples of regions where a radio wave emitted by the false signal emission unit 320 and carrying the false signal can be received are emission regions 400g, 400h, 400i, and 400k in FIG. 8.

Since the false signal emission unit 320 is a directive antenna, the emission region 400 is narrower as compared with a case where the false signal emission unit 320 is not a directive antenna. However, as illustrated in FIG. 8, the opposing UAV 10 receiving a radio wave carrying the false signal changes a movement direction in the emission region 400. Therefore, even with such a configuration, it is possible to prevent entry of the opposing UAV 10 into a region targeted for protection.

Furthermore, a user 30 being around the important facility 100 exists outside of the emission region 400 formed by a directive antenna, and therefore, can receive a radio wave from an artificial satellite 20. Thus, it is possible to reduce radio wave disturbance resulting from a radio wave carrying the false signal to the user 30. Moreover, a radio wave carrying the false signal used by the mobile body control system 2 may be low-output. Therefore, it is possible to inexpensively construct the mobile body control system 2 without departing from a related law such as Radio Law.

Still further, as illustrated in FIG. 8, the mobile body control system 2 according to the present example embodiment covers a certain range with a radio wave carrying the false signal. In a case of FIG. 8, the important facility 100 and the user 30 are covered with a radio wave carrying the false signal. Therefore, it can be said that a part covered with a radio wave carrying the false signal is an area (hereinafter, referred to as a protected area) protected from the opposing UAV 10. Moreover, as described above, a radio wave from an artificial satellite 20 can be received in this protected area. Therefore, the configuration illustrated in FIG. 8 is effective in such a case as a case of wishing to block entry of the opposing UAV 10 into, for example, a site of an apartment. Further, for example, even though the opposing UAV 10 already exists in a protected area, the opposing UAV 10 needs to pass the emission region 400 of a radio wave carrying the false signal when exiting from the protected area to outside. Therefore, the mobile body control system 2 can also limit movement of the opposing UAV 10 from inside of a protected area to outside. Thus, it is also possible to take advantage of the mobile body control system 2 for, for example, electronic enclosure when not wishing to bring the opposing UAV 10 from inside of a protected area to outside (e.g., a flight event or the like of the opposing UAV 10 in a special zone where flight of the opposing UAV 10 is permitted, or densely populated zone).

Third Example Embodiment

Although a description is given in the above-described second example embodiment assuming that the mobile body detection device 500 has a function of detecting only presence or absence of an opposing UAV 10, the mobile body detection device 500 may have a function of detecting a position of the opposing UAV 10. When the mobile body detection device 500 has this function, it is possible to more appropriately eliminate the opposing UAV 10. This case is described with reference to FIG. 9.

In a mobile body control system according to the present example embodiment, it is assumed that a position relation of each device is previously known, and a mobile body detection device 500 has a function of detecting the position of the opposing UAV 10 entering an emission region 400. In other words, a storage unit 340 in a mobile body control device 300 previously stores each of positions of a single or a plurality of mobile body detection devices 500, the mobile body control device 300, and an important facility 100. Moreover, it is assumed that the mobile body detection device 500 is configured by a radar, a plurality of cameras, a plurality of microphones, and the like, and is capable of detecting a relative position of the opposing UAV 10 seen from a self position of the mobile body detection device 500. Further, a control unit 370 of the mobile body control device 300 has a function of integrating the relative position relations, and acquiring the position of the opposing UAV 10 relative to an important facility 100.

Figure 9:
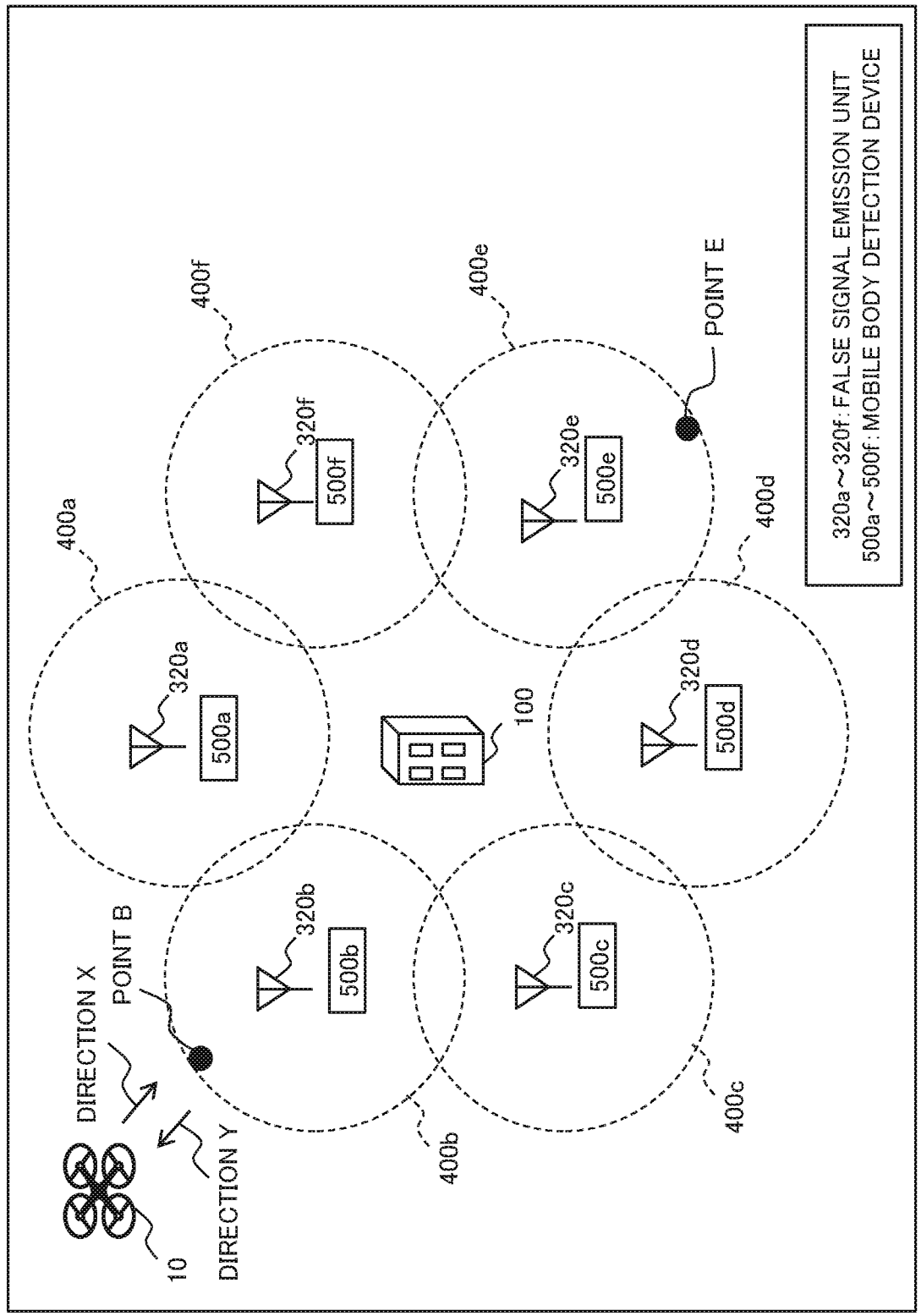
FIG. 9 is a diagram for describing one example of an operation of a mobile body.

Next, guidance of the opposing UAV 10 is described with reference to FIG. 9. FIG. 9 is a diagram for describing one example of an operation of the opposing UAV 10 receiving a radio wave carrying the false signal. Each of emission regions 400*a* to 400*f* illustrated in FIG. 9 is a region where the opposing UAV 10 can receive a radio wave carrying the false signal. In other words, a false signal emission unit 320*a* emits a radio wave carrying the false signal to the emission region 400*a*. Similarly, false signal emission units 320*b* to 320*f* emit radio waves carrying false signals to the emission regions 400*b* to 400*f*, respectively.

Furthermore, it is assumed that a region where a mobile body detection device 500*a* can detect entry of the opposing UAV 10 is similar to the emission region 400*a* being a region where the opposing UAV 10 can receive a radio wave emitted by the false signal emission unit 320*a*. Similarly, it is assumed that mobile body detection devices 500*b* to 500*f* can also detect opposing UAVs 10 entering the emission regions 400*b* to 400*f*, respectively. Note that, the emission regions 400*a* to 400*f* may be regions partly overlapping one another as illustrated in FIG. 9, or may not overlap one another.

The false signal emission units 320*a* to 320*f* may be provided in one mobile body control device 300, or may be provided in different mobile body control devices 300, respectively. Moreover, the mobile body detection devices 500*a* to 500*f* may be connected to one mobile body control device 300, or may be connected to different mobile body control devices 300, respectively.

In a description using FIG. 9, for convenience, a position relation of the opposing UAV 10, the mobile body control device 300, and the important facility 100 is planarly described. Moreover, it is assumed that the destination of the opposing UAV 10 is the important facility 100.

It is assumed that the opposing UAV 10 is moving from upper left of FIG. 9 toward the destination (important facility 100) being in a lower right direction (direction X). Then, the opposing UAV 10 moves into the emission region 400*b*. Herein, a position in the emission region 400*b* to which the opposing UAV 10 moves is referred to as a point B. The mobile body detection device 500*b* detects the opposing UAV 10 being in the emission region 400*b*, and the mobile body control device 300 executes steps S71 to S74 in FIG. 7.

Herein, it is assumed that the position calculated by the false signal generated by the false signal generation unit 310 in step S73 is a point E. The false signal emission unit 320*b* emits a radio wave carrying the false signal with which the position of the opposing UAV 10 is calculated to be the point E, and the opposing UAV 10 receives such a radio wave carrying the false signal.

The opposing UAV 10 receiving the radio wave carrying the false signal calculates the position of the opposing UAV 10 to be the point E. A destination to which the opposing UAV 10 travels is located in an upper left direction (direction Y) from the point E. Therefore, the opposing UAV 10 changes a movement direction of the opposing UAV 10 into the direction Y, and then moves. However, the opposing UAV 10 is actually at the point B, and therefore, a direction in which the opposing UAV 10 actually moves is a direction away from the important facility 100.

Then, when moving to outsides of the emission regions 400*a* to 400*f*, the opposing UAV 10 becomes able to receive a radio wave from an artificial satellite 20. Accordingly, the opposing UAV 10 again changes a movement direction into the direction X, and then moves. Then, when entering the emission region 400*b*, the opposing UAV 10 again receives a radio wave carrying the false signal, and therefore moves in the direction Y. In this way, the opposing UAV 10 repeats movements in the direction X and the direction Y.

Therefore, in the present example embodiment, the opposing UAV 10 remains at a substantially fixed position until a battery becomes dead, and the opposing UAV 10 is eliminated at the place. As compared with the second example embodiment, an elimination position of the opposing UAV 10 is more limited, and therefore, it can be said that this system is a more appropriate mobile body control system.

Fourth Example Embodiment

Figure 10:
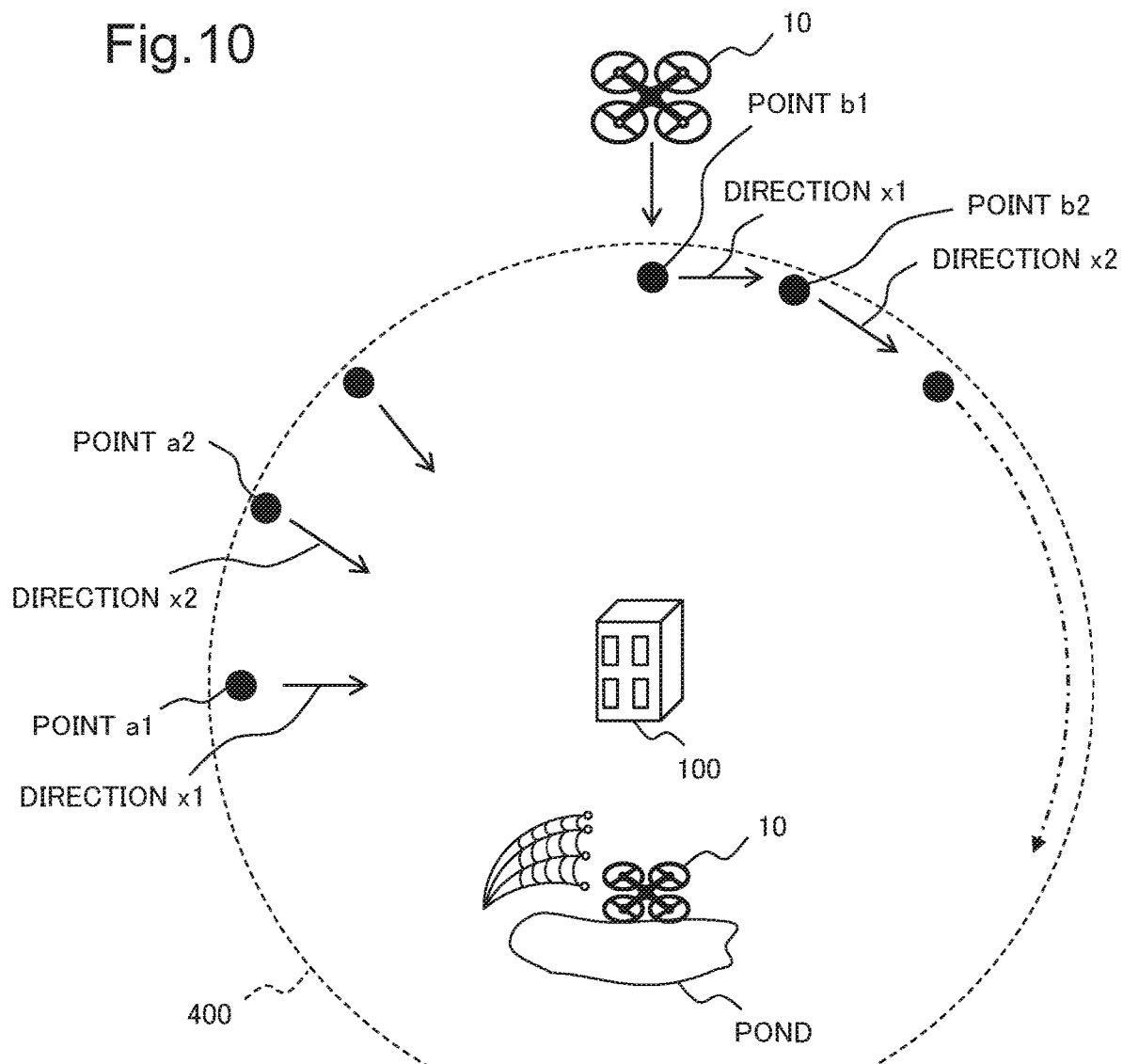
FIG. 10 is a diagram for describing another example of an operation of a mobile body.
Figure 11:
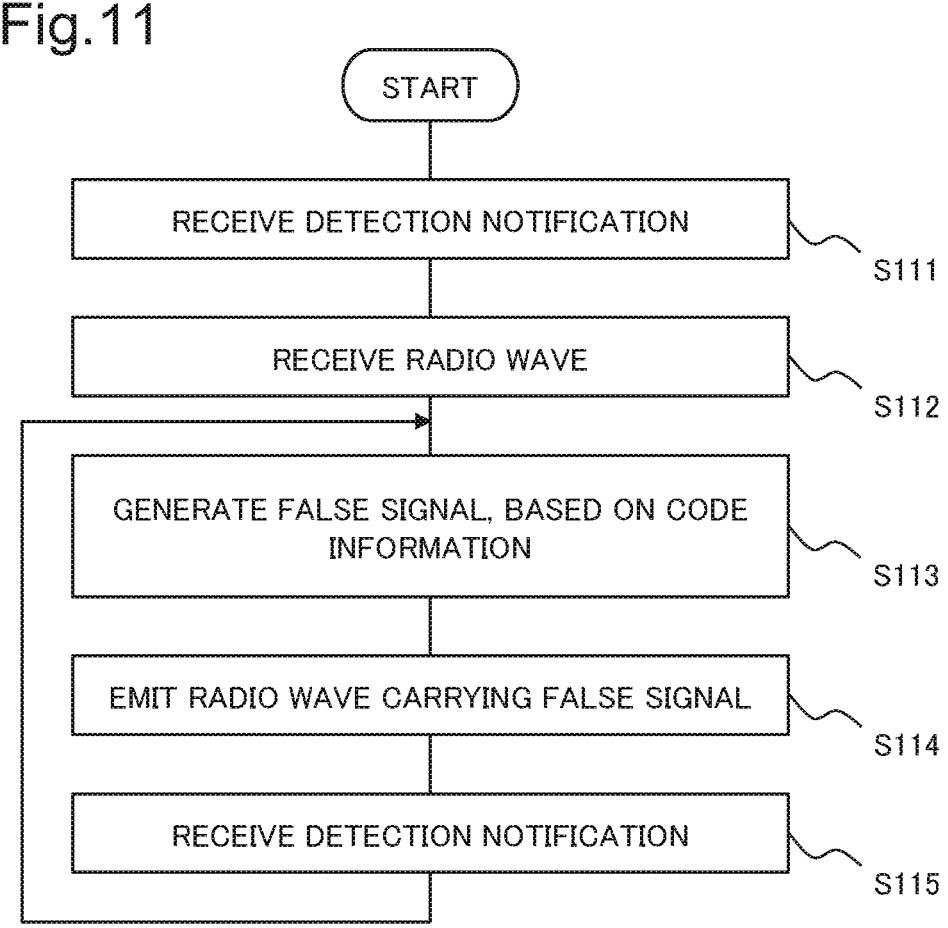
FIG. 11 is a flowchart illustrating one example of operation flow of a mobile body control device in a mobile body control system according to a fourth example embodiment.

A case where a velocity vector when an opposing UAV 10 enters a detection range or an emission region 400 can be detected is described by use of FIGS. 10 and 11, in addition to the above-described second or third example embodiment. In the present example embodiment, a false signal generation unit 310 generates a false signal having a false position which changes every moment, and a false signal emission unit 320 emits a radio wave carrying the false signal.

FIG. 10 is a diagram for describing another example of an operation of the opposing UAV 10. FIG. 11 is a flowchart illustrating one example of operation flow of a mobile body control device 300 in a mobile body control system 2 according to the present example embodiment. Note that, the mobile body control system 2 in the present example embodiment includes a configuration substantially similar to that of the mobile body control system 2 described in the second example embodiment described by use of FIG. 4, but includes a velocity vector detection unit (not illustrated) in a mobile body detection device.

It is assumed that the emission region 400 is a region surrounding an important facility 100 in FIG. 10, but a plurality of emission regions 400 may be provided as in FIG. 9.

As illustrated in FIG. 11, a reception unit 360 of the mobile body control device 300 receives a detection notification output from a mobile body detection device 500 (step S111). Note that this detection notification is assumed to include position information indicating the position where the opposing UAV 10 is detected. Then, the reception unit 360 receives a radio wave serving to calculate the position and being receivable at present (step S112). Steps S111 and S112 are similar in processing to the above-described steps S71 and S72, respectively.

The false signal generation unit 310 estimates, based on a radio wave received by the reception unit 360, code information of a signal included in the radio wave, and generates, based on the estimated code information, the false signal with which a position being different from the actual position of the opposing UAV 10 is calculated (step S113). In this instance, the false signal generation unit 310 identifies the position of the opposing UAV 10, based on position information, and calculates the false signal. For example, the false signal generation unit 310 generates the false signal in such a way that the opposing UAV 10 goes around the important facility 100 from the position at present. Note that the position indicated by the false signal generated by the false signal generation unit 310 is not limited to being the position to go around the important facility 100, and may be a given place. Note that, in an example described by use of FIGS. 10 and 11, generation of such a false signal that the position to go around the important facility 100 is calculated is described as an example. For example, when the position of the opposing UAV 10 at present is a point b1, the false signal generation unit 310 generates the false signal with which a false position becomes a point a1 illustrated in FIG. 10. In other words, the false signal generation unit 310 generates such the false signal that a false position becomes a position substantially 90 degrees from the position of the opposing UAV 10 at present. Then, the false signal emission unit 320 emits a radio wave carrying the false signal into the emission region 400 (step S114).

As illustrated in FIG. 10, the important facility 100 is in a right direction when seen from the point a1. Thus, the opposing UAV 10 receiving the radio wave carrying the false signal moves in a right direction (direction x1) from the position (point b1) at present.

Thereafter, the mobile body control device 300 receives a detection notification from the mobile body detection device 500 (step S115), and again generates such a false signal that a false position becomes a position substantially 90 degrees from the position of the opposing UAV 10 at present (step S113). For example, when the position of the opposing UAV 10 at present is a point b2, the false signal generation unit 310 generates the false signal with which a point a2 is calculated. Then, the false signal emission unit 320 emits a radio wave carrying the generated false signal (step S114). The opposing UAV 10 receiving the radio wave carrying the false signal changes a movement direction into a direction x2, and then moves. In this way, the false signal generation unit 310 generates, according to the actual position of the opposing UAV 10, the false signal with which the position to be calculated changes, and the false signal emission unit 320 emits a radio wave carrying the false signal. By repeating steps S113 to S115, the opposing UAV 10 makes a circular movement around the opposing UAV 10 as illustrated in FIG. 10, without moving close to the important facility 100. Thus, the opposing UAV 10 the battery of which has ran out lands or falls therearound.

Note that, when a given place such as a vacant lot or a place above a pond is set to the mobile body control device 300, i.e., when position information of the above-described given place is stored in a storage unit 340, the false signal generation unit 310 may determine whether or not the opposing UAV 10 is at a given place, and then generate the false signal. For example, a case where a place of a pond as illustrated in FIG. 10 is stored in the storage unit 340 as position information of a given place is described. In this case, the false signal generation unit 310 generates such a false signal that the opposing UAV 10 moves toward a direction of the pond, and the false signal emission unit 320 emits a radio wave carrying the false signal. In this way, the mobile body control device 300 guides the opposing UAV 10 to the above-described given place (i.e., a pond or the like). Then, when detecting that the opposing UAV 10 has moved to the given place, the mobile body control system 2 causes the opposing UAV 10 to stay at the place until a battery runs out, or physically eliminate the opposing UAV 10 by use of a net or the like. Note that a machine gun, laser light, or the like may be used as a method of physical elimination. In this instance, as described above, since the opposing UAV 10 has moved to a place such as a pond where the opposing UAV 10 has no influence on a third party, no secondary damage is caused even when the opposing UAV 10 is eliminated by use of a physically eliminating instrument. Therefore, the mobile body control system 2 can safely eliminate the opposing UAV 10 even by such a method.

Furthermore, as described above, when physically eliminating the opposing UAV 10 with a net or the like, the mobile body control system 2 according to the present example embodiment non-destructively eliminates the opposing UAV 10. Therefore, for example, even when an owner of the opposing UAV 10 requests a side eliminating the opposing UAV 10 to return the opposing UAV 10, the very opposing UAV 10 can be brought back.

Fifth Example Embodiment

Although descriptions are given in the above-described second to fourth example embodiments assuming one important facility 100, there may be a plurality of important facilities 100. A case that may occur when there are a plurality of important facilities 100 and a mobile body control system 2 is applied with the third example embodiment as one example is described with reference to FIG. 12.

Figure 12:
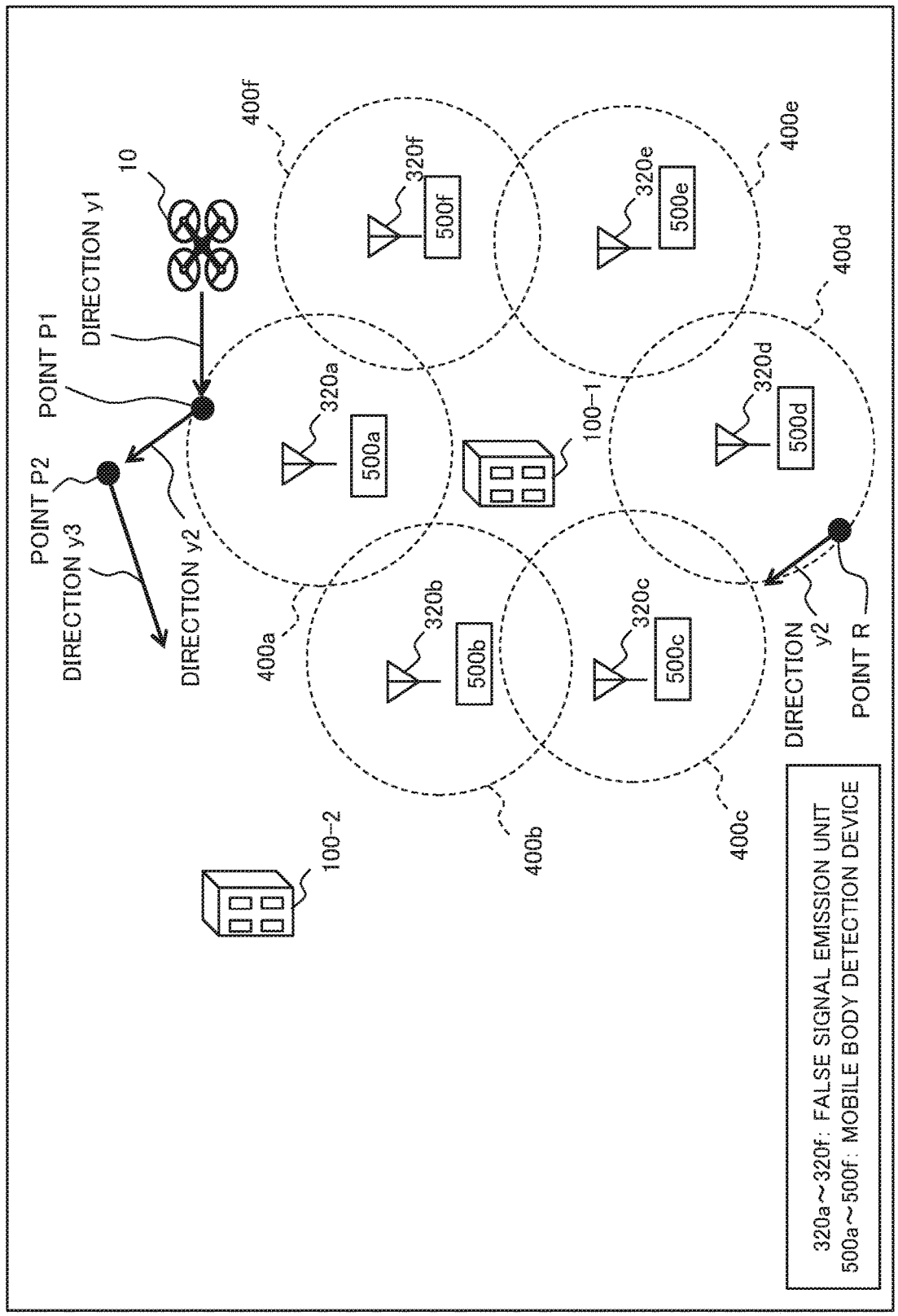
FIG. 12 is a diagram for describing one example of an operation of a mobile body.

FIG. 12 is a diagram for describing one example of an operation of an opposing UAV 10 when there are a plurality of important facilities 100. In FIG. 12, a description is given assuming two important facilities 100 (an important facility 100-1 and an important facility 100-2). Note that, false signal emission units 320a to f, mobile body detection devices 500a to f, and emission regions 400a to f included in FIG. 12 are similar to those in FIG. 9.

The opposing UAV 10 moves toward a direction y1, and arrives at a point P1. In this case, when the mobile body detection device 500a detects the opposing UAV 10 being at the point P1, the false signal emission unit 320a emits a radio wave carrying the false signal into the emission region 400a. It is assumed that a radio wave carrying the false signal emitted by the false signal emission unit 320a is a radio wave carrying a signal with which a point R is calculated. In this instance, when a destination of the opposing UAV 10 is the important facility 100-1, the opposing UAV 10 can be eliminated as in the above-described third example embodiment.

However, when the destination of the opposing UAV 10 is the important facility 100-2, a direction of the important facility 100-2 being the destination when seen from the point R is an upper left direction (direction y2). Therefore, the opposing UAV 10 moves in the upper left direction (direction y2) from a position (point P1) at present. Then, when receiving an actual radio wave after again moving to a point (for example, point P2) where an actual radio wave can be received, the opposing UAV 10 moves toward a direction (direction y3) of the important facility 100-2 being the destination from the point (point P2). In this way, when there are a plurality of points that may become destinations, there is a possibility that it is not possible to appropriately eliminate the opposing UAV 10.

Accordingly, a case of a plurality of destinations (important facilities 100) is described in the present example embodiment. Note that, for convenience of a description, a same reference sign is given to a component including a same function as a component included in the drawings described in each of the above-described example embodiments, and a description thereof is omitted.

Figure 13:
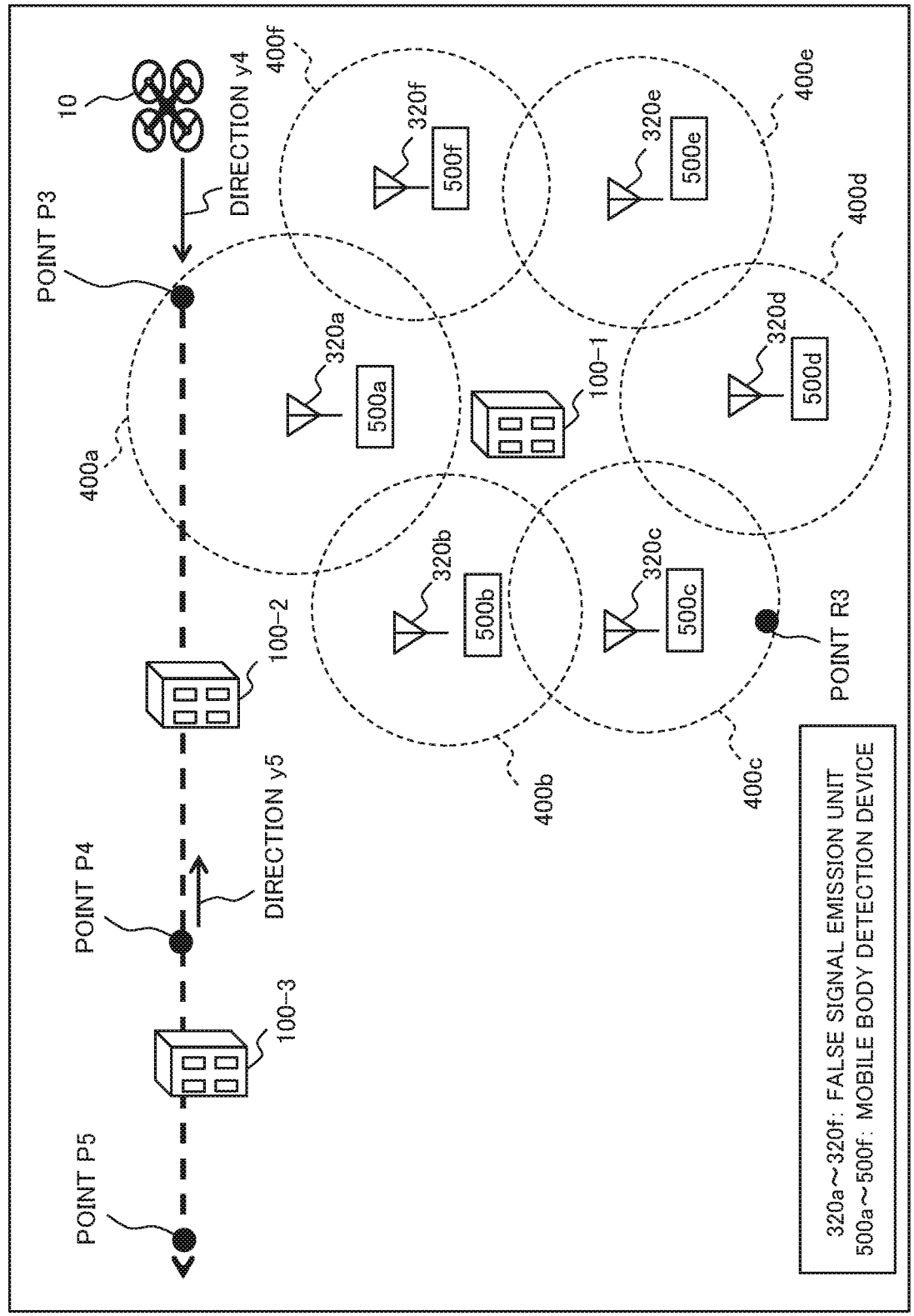
FIG. 13 is a diagram for describing one example of an operation of a mobile body.

Operation flow of a mobile body control device 300 and an operation of the opposing UAV 10 in the present example embodiment are described with reference to FIGS. 13 and 14. FIG. 13 is a diagram for describing one example of an operation of the opposing UAV 10. Note that, false signal emission units 320a to f, mobile body detection devices 500a to f, and emission regions 400a to f included in FIG. 13 are similar to those in FIG. 12. Moreover, FIG. 14 is a flowchart illustrating one example of operation flow of the mobile body control device 300 in the mobile body control system 2 according to the present example embodiment.

In addition to the function in the above-described example embodiment 3 or 4, the mobile body detection devices 500a to f in FIG. 13 each have a function of acquiring a movement direction of the opposing UAV 10. Specifically, the mobile body detection devices 500a to f are devices such as Doppler radars which can measure, singly or in combination, the position and the movement direction at a certain instant. Alternatively, the mobile body detection devices 500a to f each have a function of recording the position of the opposing UAV 10 along a time axis, and acquiring a movement direction from a change of the position of the opposing UAV 10 in relation to time.

As illustrated in FIG. 13, the opposing UAV 10 is moving in a right to left direction (direction y4). It is assumed that the opposing UAV 10 is then detected by the mobile body detection device 500a at a point P3. Accordingly, the mobile body detection device 500a outputs a detection notification to the mobile body control device 300, and therefore, a reception unit 360 of the mobile body control device 300 receives the detection notification output from the mobile body detection device 500 (step S141 in FIG. 14). Note that, this detection notification includes position information indicating the position of the opposing UAV 10, and movement direction information indicating a movement direction of the opposing UAV 10. Then, the reception unit 360 receives a radio wave serving to calculate the position and being receivable at present (step S142 in FIG. 14).

Figure 14:
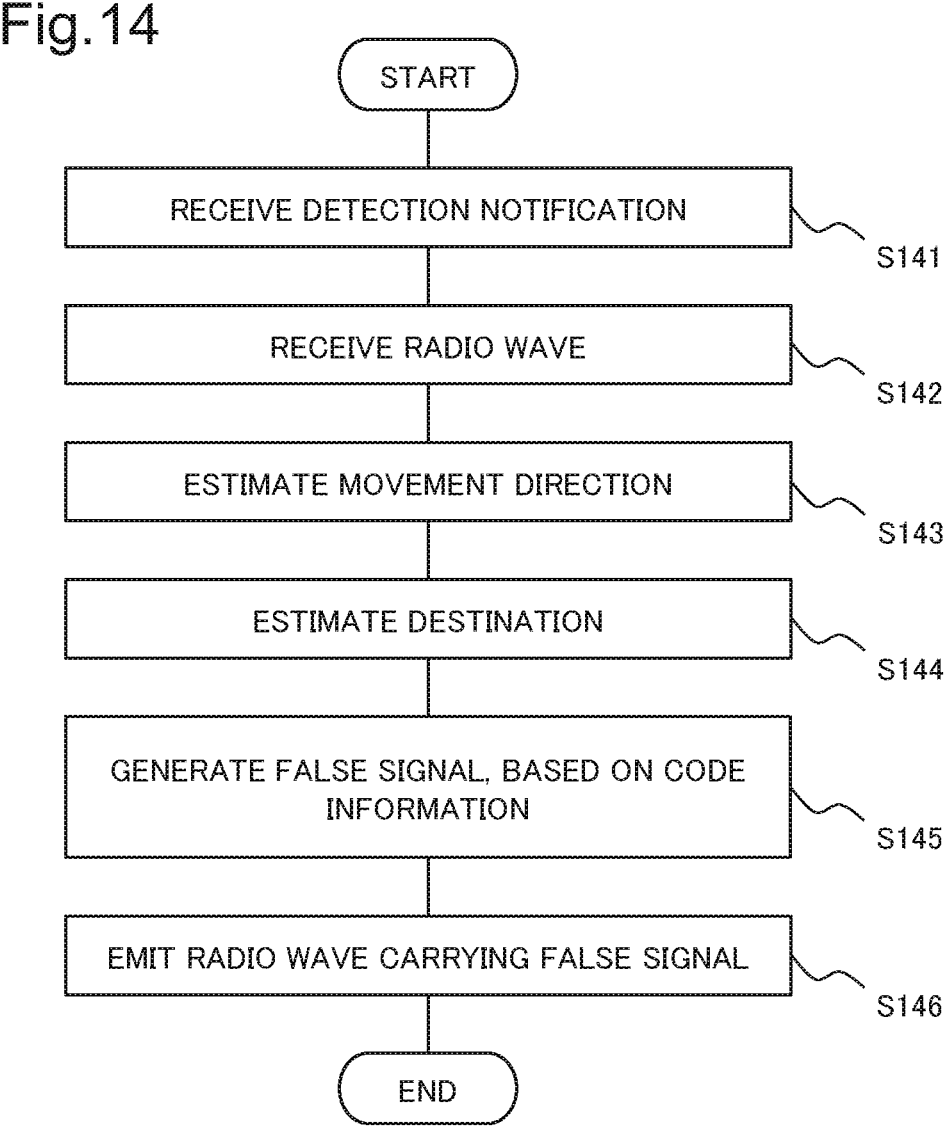
FIG. 14 is a flowchart illustrating one example of operation flow of a mobile body control device in a mobile body control system according to a fifth example embodiment.

Then, based on the actual position of the opposing UAV 10 represented by the movement direction information included in the detection notification received by the reception unit 360, a control unit 370 estimates a movement direction of the opposing UAV 10 (step S143 in FIG. 14). In a case of the example illustrated in FIG. 13, the control unit 370 estimates that a movement direction of the opposing UAV 10 is the direction y4.

Then, based on the movement direction and the actual position of the opposing UAV 10, the control unit 370 estimates the destination of the opposing UAV 10 (step S144 in FIG. 14). Since the important facility 100 being in the direction y4 from the point P3 is the important facility 100-2, the control unit 370 estimates that the destination of the opposing UAV 10 is the important facility 100-2.

Note that, steps S143 and S144 may be performed simultaneously with step S142, or may be performed before step S152.

Then, based on the estimated destination and the actual position of the opposing UAV 10, the false signal generation unit 310 generates the false signal according to the code information of the signal included in a radio wave received by the opposing UAV 10 (step S145 in FIG. 14). In the example of FIG. 13, the false signal generation unit 310 generates a false signal with which the point P3 being the actual position of the opposing UAV 10 and a point P4 being a symmetrical position with respect to the important facility 100-2 are calculated. Note that the false signal generation unit 310 may generate the false signal determining the position of the important facility 100-2 as a false position. A description is given below assuming that the false signal generation unit 310 generates the false signal with which the point P4 is calculated.

Then, the false signal emission unit 320a emits, on a radio wave, the false signal generated by the false signal generation unit 310 (step S146 in FIG. 14).

As described above, the mobile body control device 300 according to the present example embodiment can emit the false signal on a radio wave.

Figure 15:
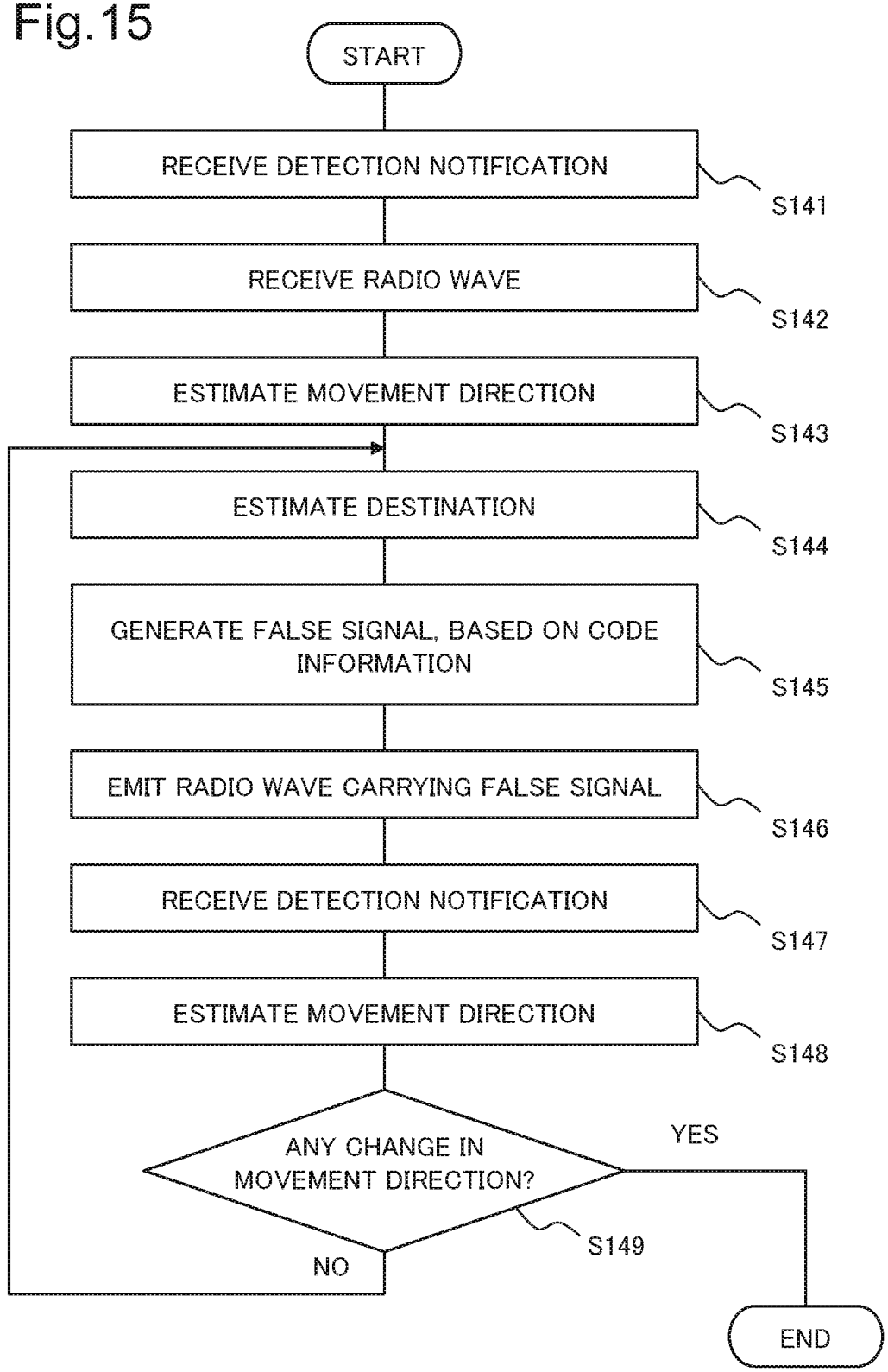
FIG. 15 is a flowchart illustrating another example of operation flow of the mobile body control device in the mobile body control system according to the fifth example embodiment.

Furthermore, the mobile body control device 300 according to the present example embodiment may perform processing illustrated in FIG. 15. FIG. 15 is a diagram illustrating one example of another operation of the mobile body control device 300 according to the present example embodiment. This example includes processing of confirming whether or not there is a change in an estimated movement direction. Note that, in FIG. 15, same reference sign is given to a same operation as that in FIG. 14, and a description thereof is omitted.

Processing in and after step S147 in FIG. 15 is described below. In step S147, the mobile body detection device 500 keeps detecting the position of the opposing UAV 10, and thereby, the reception unit 360 receives a detection notification, as in step S141 (step S147). Then, the control unit 370 estimates a movement direction of the opposing UAV 10, as in step S143 (step S148).

Then, the control unit 370 determines whether or not there is a change in the estimated movement direction (step S149).

When there is a change in the movement direction, i.e., the opposing UAV 10 moves in a direction y5 illustrated in FIG. 13 (YES in step S149), the opposing UAV 10 moves from a region where the mobile body detection device 500 can detect the opposing UAV 10, and therefore, the mobile body control device 300 ends processing. Then, as in the above-described second example embodiment, the mobile body control device 300 starts processing in step S141 when a detection notification is output from the mobile body detection device 500. The mobile body control device 300 repeats processing in steps S141 to S149 until no more detection notifications are output from the mobile body detection device 500. Thus, since the opposing UAV 10 has not arrived at the destination, the opposing UAV 10 repeats movements in the directions y4 and y5 until a battery runs out. Note that, mobile body detection devices 500a to f are also arranged around the important facilities 100-2 and 100-3, as arranged around the important facility 100-1. When the opposing UAV 10 moves in the direction y5 from the point P4, the mobile body control device 300 causes the opposing UAV 10 to wrongly recognize as if the position of the opposing UAV 10 is the point P3. Thus, the opposing UAV 10 moves from the point P4 in the direction y4, i.e., in a direction away from the important facility 100-2.

When there is no change in the movement direction, i.e., the opposing UAV 10 moves in the direction y4 from the point P3 even though a radio wave carrying the false signal is emitted (NO in step S149), the control unit 370 re-estimates the destination. When a movement direction of the opposing UAV 10 does not change, the control unit 370 determines that no important facility to be the destination is present between the point P4 and the point P3 which are positions calculated by the false signal. Then, the important facility 100-2 existing between the point P4 and the point P3 is excluded from candidates of destinations. Then, an important facility 100 being in the direction y4 from the point P3 is again searched for. As illustrated in FIG. 13, since an important facility 100 being in the direction y4 from the point P3 is the important facility 100-3, the control unit 370 estimates that the destination of the opposing UAV 10 is the important facility 100-3 (step S144). Then, the mobile body control device 300 performs steps S145 to S149.

Note that, although the opposing UAV 10 is estimated to have moved closer to a left side than the point P3 until step S146 is performed, it is determined that no important facility 100 to be the destination is present at least between the points P3 and P4. Therefore, the false signal may be again generated, and then some time may be taken for processing. In this way, the mobile body control device 300 of the mobile body control system 2 performs the processing in FIG. 15. Thereby, even when a large number of important facilities 100 that may be destinations exist, the mobile body control system 2 can eliminate the opposing UAV 10.

Furthermore, although processing is ended in a case of YES in step S149 in FIG. 15, whether or not the opposing UAV 10 has moved in an intended direction may be confirmed by returning to step S141. Thus, for example, when the destination of the opposing UAV 10 is the important facility 100-3, the control unit 370 can determine from a change in a movement direction of the opposing UAV 10 that the destination is not the important facility 100-1 even though the destination is estimated to be the important facility 100-1 in step S144. Assuming that the position calculated by the false signal when the destination is estimated to be the important facility 100-1 is a point R3, the important facility 100-3 is in an upper left direction from the point R3. Therefore, the opposing UAV 10 moves in the upper left direction from the point P3. Thus, the mobile body control device 300 can determine that an original destination is present in the upper left direction when seen from the point B. In other words, the mobile body control device 300 can estimate a direction of an original destination from an initial position and a movement direction, and the position and the movement direction changed by the false signal generated when estimation of the destination is incorrect.

Figure 16:
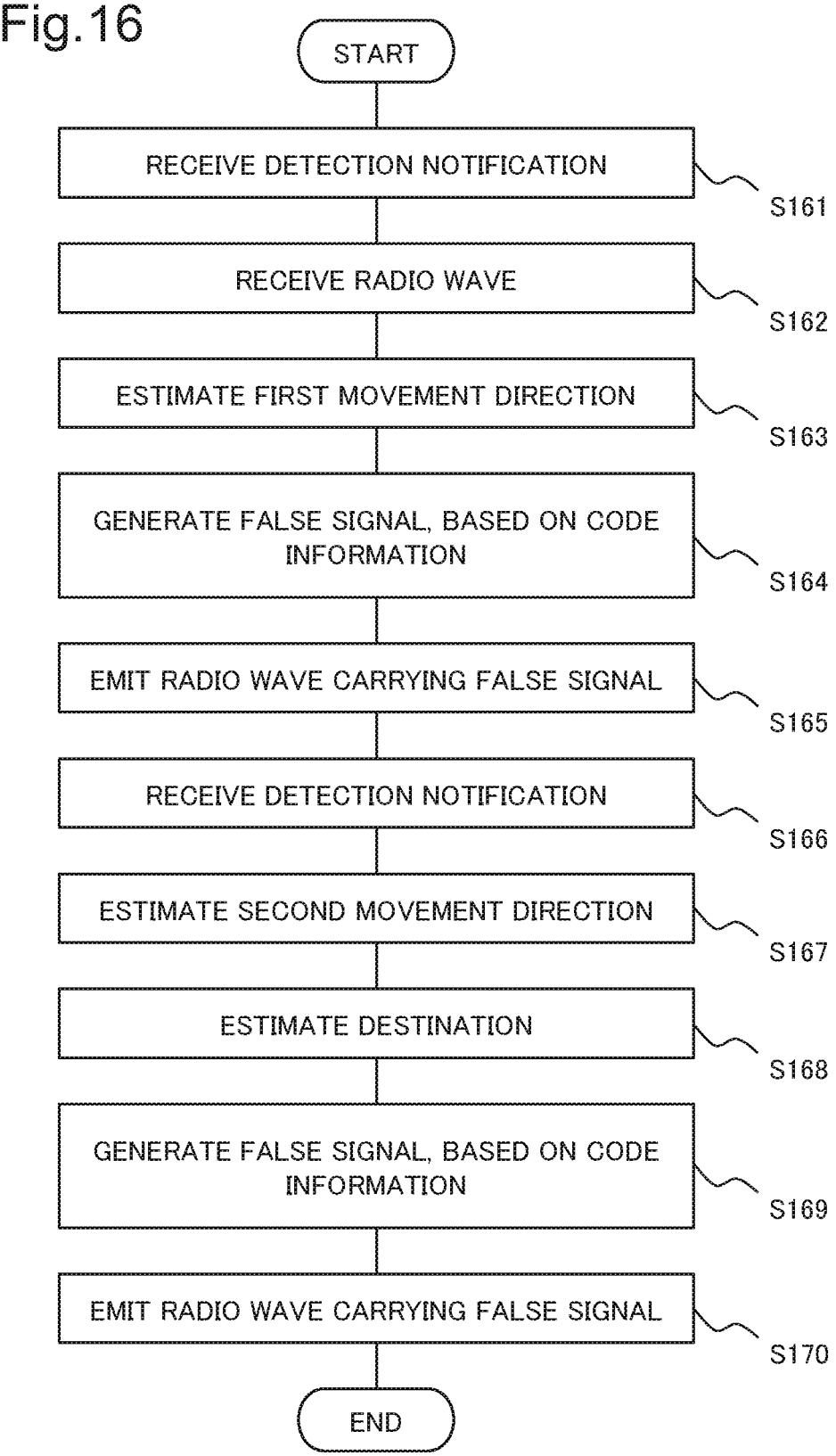
FIG. 16 is a flowchart illustrating another example of operation flow of the mobile body control device in the mobile body control system according to the fifth example embodiment.

Another example of estimation of the destination by the control unit 370 is described with reference to FIGS. 16 and 17. In the another example, at least one piece of position information indicating a position of a point that may be the destination needs only to be stored in the storage unit 340. The position information of which is stored in the storage unit 340 is an important facility 100 in FIG. 17. FIG. 16 is a flowchart illustrating another example of operation flow of the mobile body control device 300 of the mobile body control system 2 according to the present example embodiment. Further, FIG. 17 is a diagram for describing another example of an operation of the opposing UAV 10.

Figure 17:
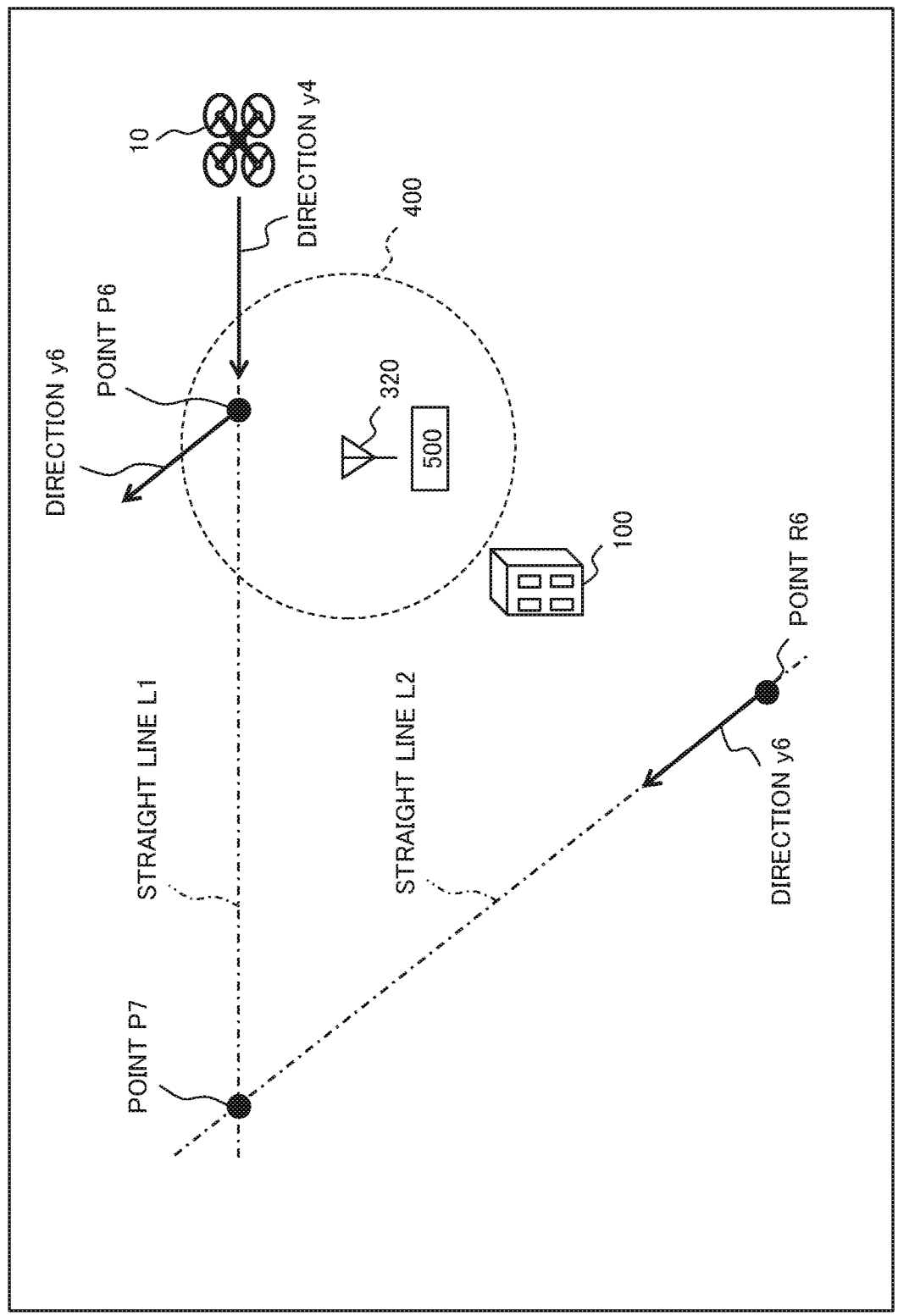
FIG. 17 is a diagram for describing another example of an operation of a mobile body.

As illustrated in FIG. 17, the opposing UAV 10 is moving in a direction from left to right (direction y4). Then, it is assumed that the opposing UAV 10 enters an emission region 400, and is detected by the mobile body detection device 500 at a point P6. Accordingly, the mobile body detection device 500 outputs a detection notification to the mobile body control device 300. Therefore, as illustrated in FIG. 16, the reception unit 360 of the mobile body control device 300 receives the detection notification output from the mobile body detection device 500 (step S161 in FIG. 16). Note that, this detection notification includes position information indicating the position where the opposing UAV 10 is detected, and movement direction information. Then, the reception unit 360 receives a radio wave serving to calculate the position and being receivable at present (step S162 in FIG. 16).

The control unit 370 estimates a movement direction of the opposing UAV 10 represented by the movement direction information included in the detection notification received by the reception unit 360 (step S163 in FIG. 16). Herein, a movement direction estimated by the control unit 370 is referred to as a first movement direction. In a case of the example illustrated in FIG. 17, the control unit 370 estimates that a movement direction of the opposing UAV 10 is the direction y4, based on an actual movement direction of the opposing UAV 10.

Then the false signal generation unit 310 generates the false signal according to the code information of the signal included in a radio wave received by the opposing UAV 10 (step S164 in FIG. 16). In this instance, a description is given assuming that, in FIG. 17, the false signal generation unit 310 generates the false signal with which the point P6 being the actual position of the opposing UAV 10 and the point R6 being a symmetrical position with respect to the important facility 100 stored in the storage unit 340 are calculated. Note that a false position calculated by the false signal may be a given position. Then, the false signal emission unit 320 emits a radio wave carrying the false signal generated by the false signal generation unit 310 (step S165 in FIG. 16).

The opposing UAV 10 receiving the radio wave carrying the above-described false signal calculates that the position of the opposing UAV 10 is the point R6, and moves toward the destination from the point R6. The mobile body detection device 500 detects this movement, and the reception unit 360 receives a detection notification from the mobile body detection device 500 (step S166 in FIG. 16). Then, based on an actual movement direction of the opposing UAV 10 represented by the movement direction information included in the detection notification received by the reception unit 360, the control unit 370 estimates a movement direction of the opposing UAV 10 (step S167 in FIG. 16). A movement direction estimated by the control unit 370 in step S167 is referred to as a second movement direction.

Then, the control unit 370 estimates the destination of the opposing UAV 10 (step S168 in FIG. 16). The control unit 370 estimates, as the destination of the above-described mobile body, an intersection of a straight line traveling toward the first movement direction from the actual position of the opposing UAV 10 before a radio wave carrying the false signal is emitted, and a straight line traveling toward the second movement direction from a different position calculated by the false signal. Specifically, the control unit 370 estimates an intersection (referred to as a point P7) of the following two straight lines (straight lines L1 and L2) as the destination.

Straight line L1: It is assumed that a point where the opposing UAV 10 is actually located before the false signal emission unit 320 emits a radio wave carrying the false signal is the point P6. Moreover, it is assumed that a direction in which the opposing UAV 10 is moving before a radio wave carrying the false signal is emitted is the first movement direction (direction y4). The straight line L1 is a straight line passing the point P6 and extending in the first movement direction (direction y4).

Straight line L2: It is assumed that a point being a false position calculated by the false signal included in a radio wave emitted by the false signal emission unit 320 is R6. Moreover, it is assumed that a direction in which the opposing UAV 10 moves after the false signal emission unit 320 emits a radio wave carrying the false signal is the second movement direction (direction y6). The straight line L2 is a straight line passing the point R6 and extending in the second movement direction (direction y6).

Then, the control unit 370 supplies position information of the point P7 being an estimated destination to the false signal generation unit 310.

Based on the destination estimated to be present at the point P7, and the actual position of the opposing UAV 10, the false signal generation unit 310 regenerates the false signal according to the code information (step S169). Then, the false signal emission unit 320 emits a radio wave carrying the false signal generated by the false signal generation unit 310 (step S170).

As described above, the mobile body control device 300 emits a radio wave carrying the false signal. Thus, it is possible to estimate the destination of the opposing UAV 10 without previously registering an important facility 100 being present at the point P7.

When the opposing UAV 10 flies, there is a case where a passing point (way point) is set on a way in addition to a final destination. For example, there is a case where, when a tall building or a landform blocking flight is present between the actual position and the destination, the way point is set in order to avoid the tall building or landform. A way point is a coordinate for determining a route of flight, and no characteristic building or the like exists at this position in many cases. Therefore, it is difficult to previously register the way point in the storage unit 340. However, as described above, by estimating the destination by use of the movement direction, the actual position, and the false position, a way point having no characteristic can be estimated as the destination. Therefore, the mobile body control device 300 generates the false signal around the way point, and can emit the false signal on a radio wave. Consequently, the mobile body control device 300 can eliminate the opposing UAV 10 at a position farther from the final destination.

Sixth Example Embodiment

Next, a sixth example embodiment is described. The mobile body control device 300 in each of the above-described second to fifth example embodiments, and each function of the mobile body control device 300 are described regarding a case where a fixed device, an airship, or the like is provided at a predetermined position. In the present example embodiment, a configuration in which a mobile body control device 300, and a function related to a false signal emission unit 320 among respective functions included in the mobile body control device 300 are provided for a mobile device being capable of moving according to a situation is described.

Note that, for convenience of description, a same reference sign is given to a component including a same function as a component included in the drawings described in each of the above-described example embodiments, and a description thereof is omitted.

Figure 18:
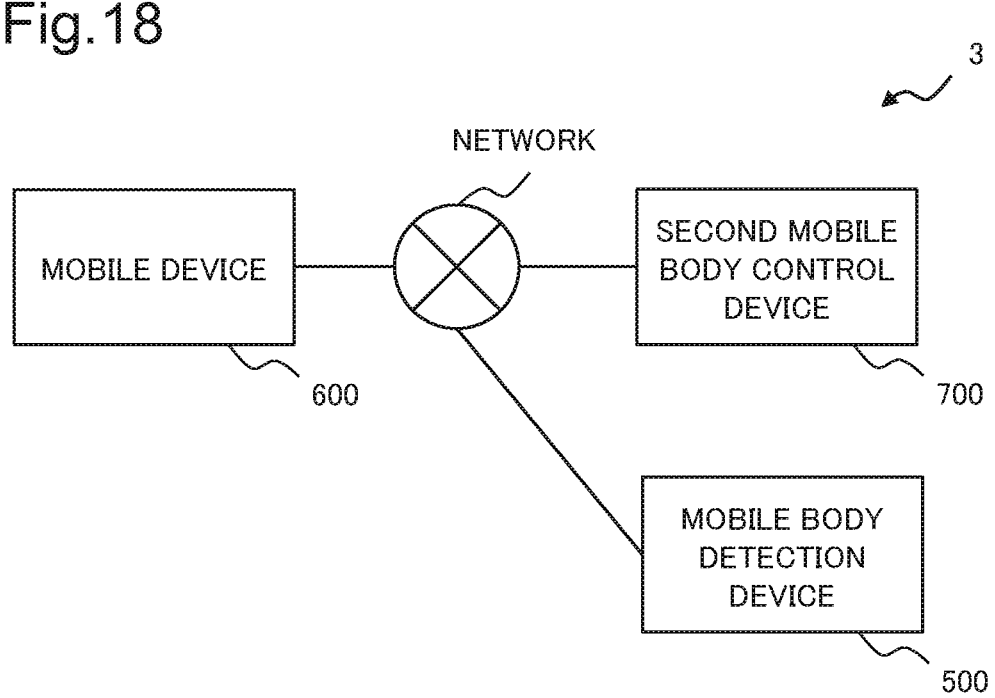
FIG. 18 is a diagram illustrating one example of an overall configuration of a mobile body control system according to a sixth example embodiment.

FIG. 18 is a diagram illustrating one example of an overall configuration of a mobile body control system 3 according to the present example embodiment. As illustrated in FIG. 18, the mobile body control system 3 includes a mobile body detection device 500, a mobile device 600, and a second mobile body control device 700. Note that, in the present example embodiment, the mobile body detection device 500 may be configured to be included in the second mobile body control device 700 as a detection unit, similarly to the mobile body detection device 500 described in each of the second to fifth example embodiments.

Although a description is given assuming that the mobile device 600 is, for example, a flying body similar to an opposing UAV 10, the mobile device 600 may be a mobile body different in kind from the opposing UAV 10.

Figure 19:
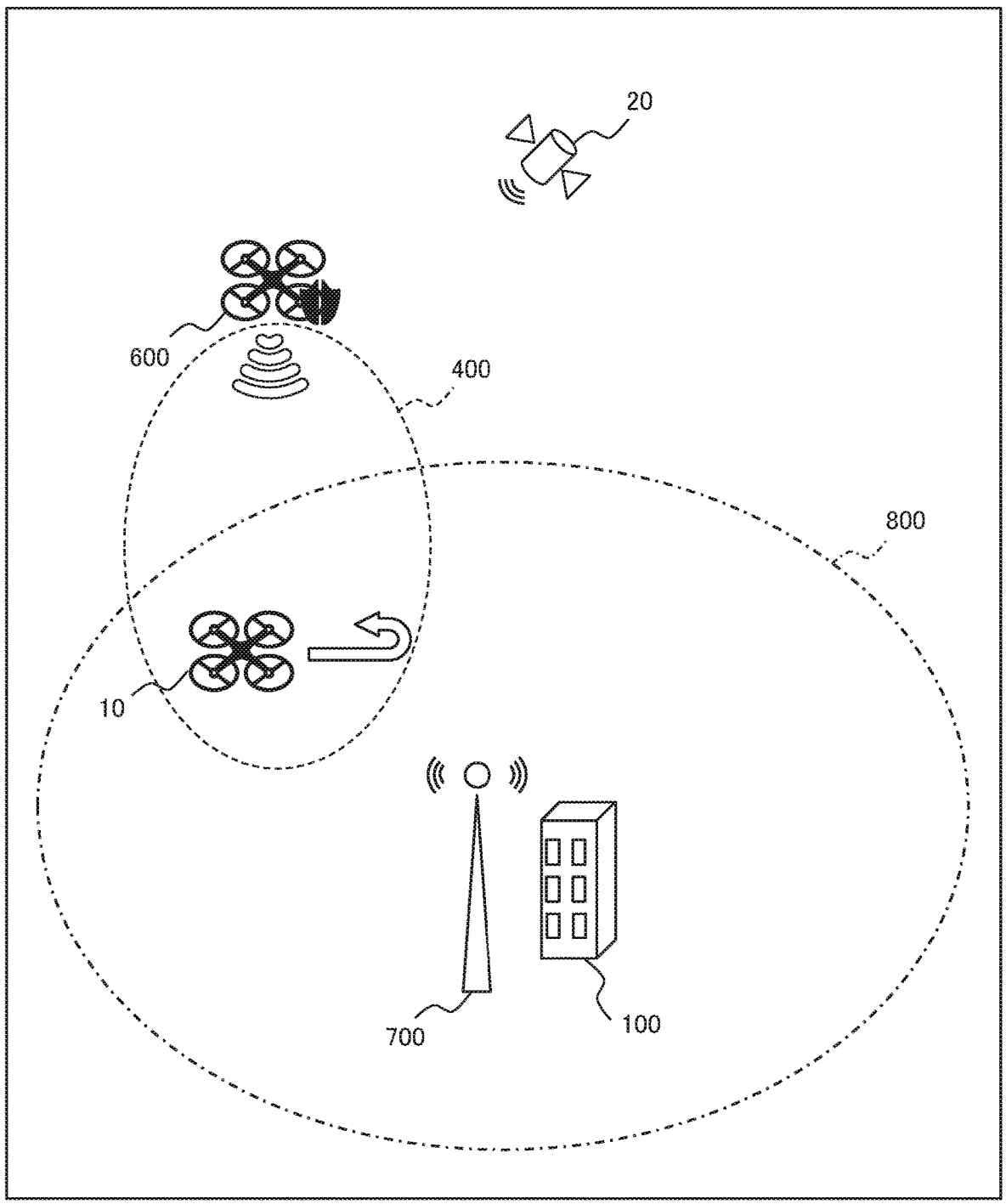
FIG. 19 is a diagram for describing an application example of the mobile body control system according to the sixth example embodiment.

FIG. 19 is a diagram for describing an application example of the mobile body control system 3 according to the present example embodiment. The opposing UAV 10 is moving toward an important facility 100, and when the opposing UAV 10 enters a detection range 800 being a detection range of the second mobile body control device 700, the second mobile body control device 700 detects the opposing UAV 10. Then, based on code information of a signal included in a radio wave received by the opposing UAV 10, the second mobile body control device 700 generates a false signal included in a radio wave to be emitted to the opposing UAV 10. Then, the mobile device 600 moves to a region (emission region 400) where the opposing UAV 10 can receive the radio wave carrying the false signal, up to a position including the opposing UAV 10. Then, the mobile device 600 emits a radio wave carrying the false signal into the emission region 400. Accordingly, the opposing UAV 10 receives not a radio wave from an artificial satellite 20 but a radio wave carrying the false signal. Thus, the opposing UAV 10 moves according to the position calculated by the false signal. Thereafter, even when the opposing UAV 10 moves, the mobile device 600 keeps emitting a radio wave carrying the false signal while flying in such a way that the opposing UAV 10 does not deviate from a region (emission region 400) where the opposing UAV 10 can receive a radio wave carrying the false signal. Consequently, the mobile device 600 can guide the opposing UAV 10 to a given place such as a pond. Therefore, as in each of the above-described example embodiments, the mobile body control system 3 can eliminate the opposing UAV 10.

Note that the mobile device 600 may be automatically or manually controlled from outside. For example, when the mobile device 600 is manually controlled, a manipulator who performs control may control the mobile device 600 visually or by use of a controller while watching an image acquired from an imaging device mounted on the mobile device 600. Moreover, the manipulator may control the mobile device 600 by use of a radar, a result of processing a photographed image, or the like. Note that, in the present example embodiment, a description is given assuming that the mobile device 600 is controlled from the second mobile body control device 700.

Note that there may be one mobile device 600 or a plurality of mobile devices 600. When there are a plurality of mobile devices 600, the plurality of mobile devices 600 may simultaneously operate. Moreover, based on a result of dividing a region, a timeline, and the like, each of the plurality of mobile devices 600 may operate in consideration of controllable ranges of a battery and the mobile device 600.

Figure 20:
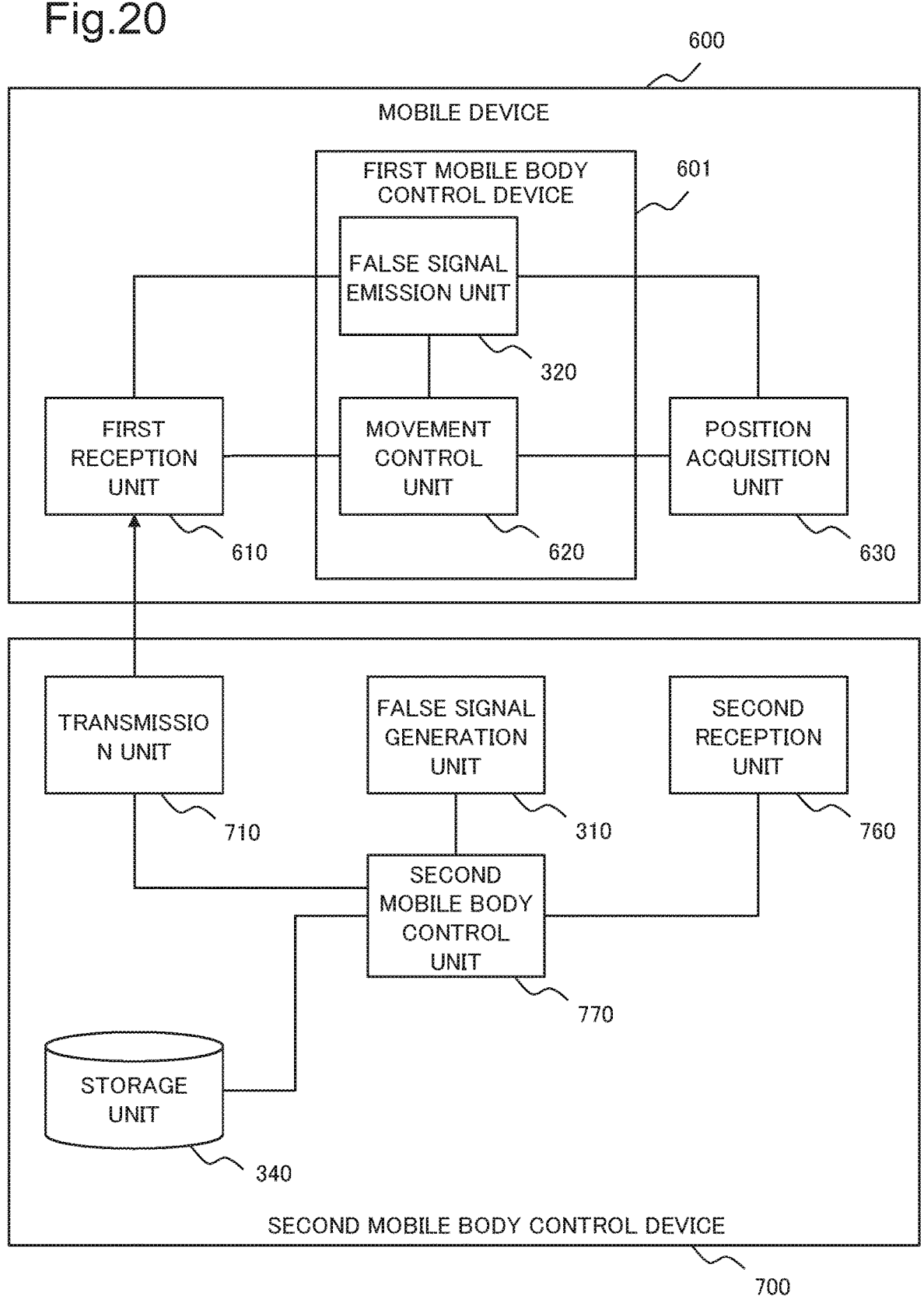
FIG. 20 is a functional block diagram illustrating one example of a functional configuration of each device in the mobile body control system according to the sixth example embodiment.

Next, functional configurations of the mobile device 600 and the second mobile body control device 700 in the mobile body control system 3 according to the present example embodiment are described with reference to FIG. 20. FIG. 20 is a functional block diagram illustrating one example of the functional configurations of the mobile device 600 and the second mobile body control device 700 in the mobile body control system 3 according to the present example embodiment.

As illustrated in FIG. 20, the second mobile body control device 700 includes a false signal generation unit 310, a storage unit 340, a transmission unit 710, a second reception unit 760, and a second mobile body control unit 770. The second reception unit 760 includes a function similar to that of the reception unit 360 in each of the above-described second to fifth example embodiments. Moreover, the second mobile body control unit 770 includes a function similar to that of the control unit 370 in each of the above-described second to fifth example embodiments. Therefore, the second mobile body control device 700 has a configuration including, out of the mobile body control device 300 in the above-described second example embodiment, the false signal generation unit 310, the storage unit 340, the second reception unit 760 associated with the reception unit 360, and the second mobile body control unit 770 associated with the control unit 370. Note that the second mobile body control device 700 may further include an input acceptance unit 350.

Similarly to the mobile body control device 300, the second mobile body control device 700 generates the false signal out of information from the mobile body detection device 500, based on the code information of the signal included in a radio wave received by the second reception unit 760, by use of the second mobile body control unit 770, the storage unit 340, the second reception unit 760, and the false signal generation unit 310. Moreover, at the same time, the second mobile body control device 700 receives position information and movement direction information from the mobile body detection device 500. Then, the transmission unit 710 transmits, to the mobile device 600, the generated false signal, position information representing final destination position of the opposing UAV 10, and movement direction information of the opposing UAV 10. Note that the transmission unit 710 may separately transmit these pieces of information. For example, each time the mobile body detection device 500 detects the opposing UAV 10, the transmission unit 710 may transmit position information and movement direction information to the mobile device 600.

The mobile device 600 includes a first mobile body control device 601. Moreover, the mobile device 600 may further include a first reception unit 610, a movement control unit 620, and a position acquisition unit 630. The first mobile body control device 601 includes the false signal emission unit 320 and the movement control unit 620. Thus, the mobile device 600 has a configuration including the false signal emission unit 320 in each of the above-described second to fifth example embodiments. Note that the first reception unit 610 and the position acquisition unit 630 may be included in the first mobile body control device 601.

The first reception unit 610 receives position information, movement direction information, and the false signal from the second mobile body control device 700. The first reception unit 610 supplies the received false signal to the false signal emission unit 320. Moreover, the first reception unit 610 supplies the received position information to the movement control unit 620.

The position acquisition unit 630 acquires the position of a local device (mobile device 600). The position acquisition unit 630 may acquire the position (absolute position) of the local device, for example, by receiving a radio wave of a GPS signal or the like and then calculating the position from the radio wave. Moreover, the position acquisition unit 630 may acquire an altitude of the local device. Further, the position acquisition unit 630 may acquire a posture, a speed, and a relative position, for example, by use of an inertial measurement unit (IMU).

Furthermore, the position acquisition unit 630 may acquire, as the position of the local device, a relative position relation between the local device and the opposing UAV 10. While a method by which the position acquisition unit 630 acquires a relative position relation between the local device and the opposing UAV 10 is not particularly limited, a method which acquires the relation from a photography image may be adopted, for example. In this case, the position acquisition unit 630 is implemented by an imaging device, and an image processing device which performs image processing for a photography image photographed by the imaging device. The position acquisition unit 630 may analyze a size or the like of the opposing UAV 10 included in the photography image, and acquire a relative position relation between the mobile device 600 and the opposing UAV 10. Alternatively, an imaging device is a stereo camera, and the position acquisition unit 630 may acquire a relative position relation from 3D data acquired from the stereo camera.

The position acquisition unit 630 supplies the acquired position information of the local device to the movement control unit 620.

The movement control unit 620 receives actual position information and movement direction information of the opposing UAV 10 from the first reception unit 610. Moreover, the movement control unit 620 receives position information of the local device from the position acquisition unit 630.

The movement control unit 620 controls in such a way that the mobile device 600 is located within a predetermined range of the opposing UAV 10. When the mobile device 600 automatically moves, the movement control unit 620 drives a motor or the like, and moves the mobile device 600. Moreover, when the mobile device 600 moves based on an instruction from outside, the movement control unit 620 accepts the instruction, and moves the mobile device 600, based on the accepted instruction.

The movement control unit 620 preferably moves the mobile device 600 to a position higher in altitude than the opposing UAV 10. This is because, in order to receive a radio wave from an artificial satellite 20, generally, an antenna receiving a radio wave is likely to be provided in such a way as to receive a radio wave reaching from a direction at a high altitude (referred to as an upward direction). Therefore, by emitting a radio wave carrying the false signal from a high altitude which becomes a same direction as an artificial satellite when seen from the opposing UAV 10, the mobile device 600 can cause the opposing UAV 10 to efficiently receive a radio wave carrying the false signal.

The movement control unit 620 determines whether or not the opposing UAV 10 exists in an emission region 400 of the mobile device 600 as a result of controlling and thus moving the mobile device 600. Then, based on the determination result, the movement control unit 620 controls whether to emit or stop a radio wave carrying the false signal from the false signal emission unit 320.

The false signal emission unit 320 receives the false signal from the first reception unit 610. Then, by receiving control of emitting or stopping a radio wave from the movement control unit 620, the false signal emission unit 320 emits a radio wave carrying the false signal.

Note that, the false signal emission unit 320 may change, based on the acquired position information received from the position acquisition unit 630, intensity of a radio wave carrying the false signal to be emitted. Reception intensity of a radio wave is attenuated in proportion to a square of the distance. In other words, reception intensity of a radio wave is represented by Equation (1) below being a Friis's formula.

[Equation 1]

$$P_R = \left(\frac{\lambda}{4\pi D}\right)^2 G_T G_R P_T \quad (1)$$

Herein, $P_R$: reception power [W], $P_T$: transmission power [W], $G_R$: reception gain, $G_T$: transmission gain, $\lambda$: wavelength [m], and D: distance [m].

For example, a case where intensity of a radio wave output from an artificial satellite 20 being at an altitude of 20,200 km is −140 dBm on the ground is considered. In this case, intensities of radio waves received from the artificial satellite 20 by the mobile device 600 flying at an altitude of 101 m and the opposing UAV 10 flying at an altitude of 100 m are both substantially −140 dBm.

In this case, the mobile device 600 emits a radio wave carrying the false signal being higher in intensity than a radio wave output from the artificial satellite 20. For example, the mobile device 600 emits a radio wave carrying the false signal the intensity of which becomes −120 dBm when the distance is 1 m. In the above-described example, a distance between the opposing UAV 10 and the mobile device 600 is 1 m, and therefore, the opposing UAV 10 receives a radio wave carrying the false signal having an intensity of −120 dBm. However, since the distance between the opposing UAV 10 and the ground is 100 m, intensity of the radio wave carrying the false signal becomes −160 dBm on the ground being 100 m distant. Thus, a radio wave carrying the false signal is approximately 100 times higher in intensity than a radio wave output from the artificial satellite 20 when seen from the opposing UAV 10, and is approximately 100 times lower in intensity than a radio wave output from the artificial satellite 20 when seen from the ground.

Thus, since there is almost no influence of a radio wave carrying the false signal emitted from the mobile device 600 on the ground, the mobile device 600 can emit a radio wave carrying the false signal having a smaller influence on an instrument other than the opposing UAV 10 utilizing a radio wave output from the artificial satellite 20. Moreover, the false signal emission unit 320 needs only to emit a radio wave carrying the false signal with a small radio wave output.

By use of a characteristic of intensity of a radio wave as described above, the false signal emission unit 320 may emit the signal by changing intensity of a radio wave carrying the false signal according to an altitude of the mobile device 600 indicated by the acquired position information received from the position acquisition unit 630.

Furthermore, the false signal emission unit 320 may emit the signal by changing intensity of a radio wave carrying the false signal according to a distance between the mobile device 600 and the opposing UAV 10 indicated by the acquired position information received from the position acquisition unit 630.

For example, when the distance between the opposing UAV 10 and the mobile device 600 is short, the false signal emission unit 320 may decrease intensity of a radio wave carrying the false signal. Thus, it is possible to reduce power required for the mobile device 600, and further reduce an influence on an instrument on the ground utilizing a radio wave from the artificial satellite 20.

Still further, the false signal emission unit 320 may emit the signal by changing intensity of a radio wave carrying the false signal according to the position of the mobile device 600 indicated by the acquired position information received from the position acquisition unit 630. For example, when a facility or an instrument using a radio wave from the artificial satellite 20 exists at the position on the ground associated with the position of the mobile device 600, the false signal emission unit 320 may decrease intensity of a radio wave carrying the false signal. When such a facility or an instrument does not exist, the false signal emission unit 320 may increase intensity of a radio wave carrying the false signal. As a facility or an instrument using a radio wave from an artificial satellite 20, an automobile or the like utilizing a car navigation system is cited, for example. Thus, it is possible to further reduce an influence on an instrument on the ground utilizing a radio wave from the artificial satellite 20.

As described above, based on the acquired position information received from the position acquisition unit 630, the false signal emission unit 320 may change intensity of a radio wave carrying the false signal according to at least one of an altitude of the mobile device 600, the distance from the opposing UAV 10, and a position of the mobile device 600.

Figure 21:
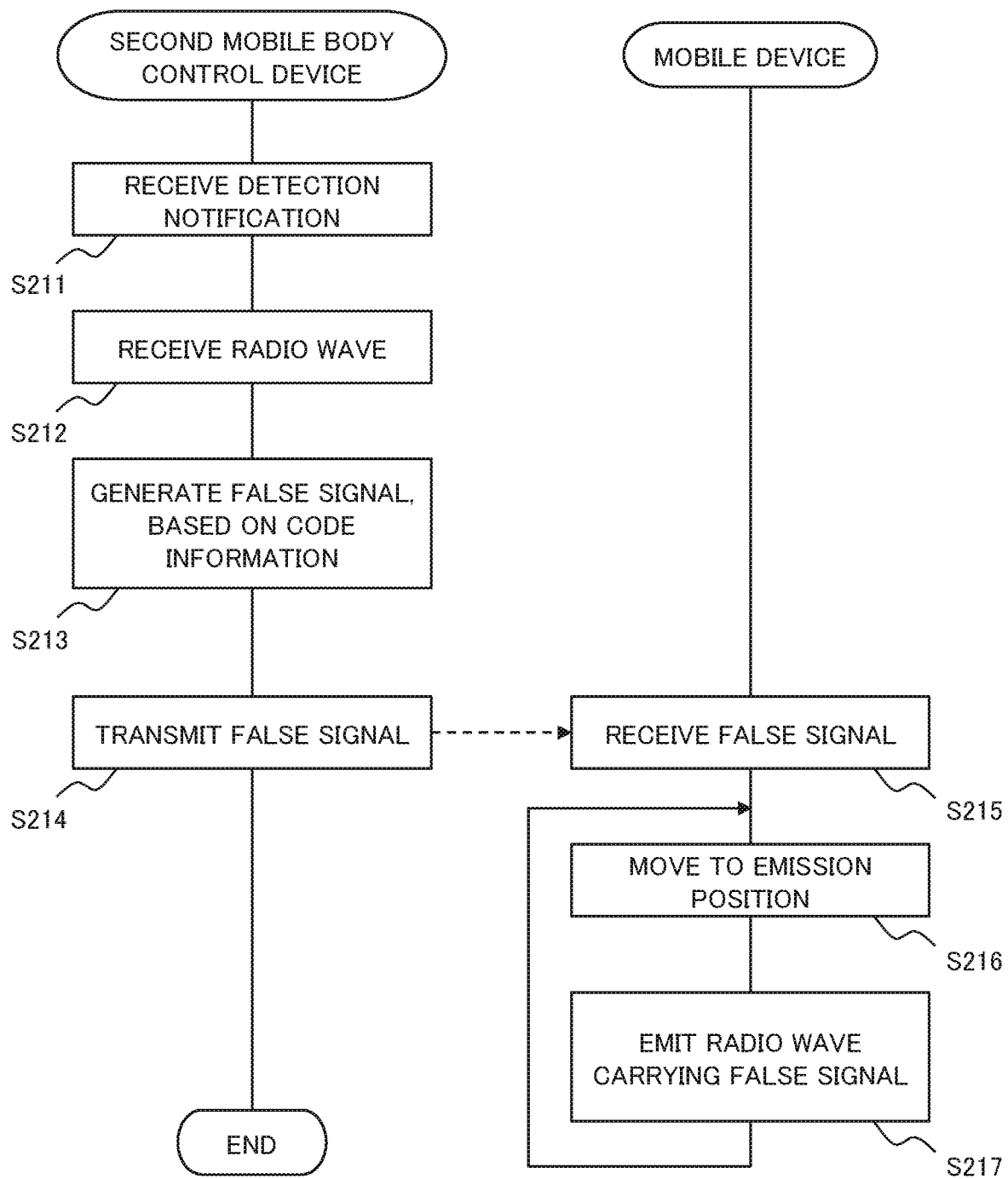
FIG. 21 is a flowchart illustrating one example of operation flow of each device in the mobile body control system according to the sixth example embodiment.

FIG. 21 is a flowchart illustrating one example of operation flow of the mobile device 600 and the second mobile body control device 700 in the mobile body control system 3 according to the present example embodiment. In FIG. 21, processing of the second mobile body control device 700 is illustrated on a left side, and processing of the mobile device 600 is illustrated on a right side. Moreover, a broken-line arrow between the second mobile body control device 700 and the mobile device 600 indicates flow of information.

As illustrated in FIG. 21, when the mobile body detection device 500 detects the opposing UAV 10 and outputs a detection notification to the second mobile body control device 700, the second reception unit 760 of the second mobile body control device 700 receives the detection notification output from the mobile body detection device 500 (step S211). Then, the second reception unit 760 receives a radio wave serving to calculate the position and being receivable at present (step S212).

Then, based on the code information of the signal included in the radio wave received by the second reception unit 760, the false signal generation unit 310 generates the false signal (step S213). Thereafter, the transmission unit 710 transmits the generated false signal to the mobile device 600 together with position information (step S214).

The first reception unit 610 of the mobile device 600 receives the false signal from the second mobile body control device 700 together with the position information (step S215). Then, the movement control unit 620 moves the mobile device 600 into a predetermined range from the opposing UAV 10 being an emission position of a radio wave carrying a false signal (step S216). Then, the false signal emission unit 320 emits a radio wave carrying the false signal (step S217).

Thereafter, when the position acquired by the position acquisition unit 630 is transmitted or position information is transmitted from the second mobile body control device 700, the movement control unit 620 of the mobile device 600 moves the mobile device 600 according to the position of the opposing UAV 10 represented by the position information (step S216). Thus, when the opposing UAV 10 moves, the mobile device 600 can move together. Then, the false signal emission unit 320 emits a radio wave carrying the false signal (step S217). Accordingly, the opposing UAV 10 is guided to a predetermined position.

As in the above-described first to fifth example embodiments, the mobile body control system 3 according to the present example embodiment can appropriately eliminate the opposing UAV 10. Moreover, in the mobile body control system 3 according to the present example embodiment, the false signal emission unit 320 is provided in the mobile device 600. The mobile device 600 moves to a position located within a predetermined range from the opposing UAV 10, and then emits a radio wave including the false signal. Thus, the false signal emission unit 320 can emit a radio wave carrying the false signal at low intensity. Moreover, since intensity of a radio wave carrying the false signal emitted by the false signal emission unit 320 can be low, a radio wave carrying the false signal received by an instrument other than the opposing UAV 10 also becomes low. Therefore, according to the mobile body control system 3 in the present example embodiment, it is possible to reduce an influence on an instrument other than the opposing UAV 10.

Furthermore, the mobile body control system 3 according to the present example embodiment needs only to be provided with the mobile device 600 which moves only when emitting a radio wave carrying the false signal, and ground facilities such as an antenna facility installed after previously securing a place to emit a radio wave carrying the false signal are reduced. Therefore, the mobile body control system 3 according to the present example embodiment is capable of low-cost and flexible operation, as compared with the mobile body control system 2 in each of the above-described second to fifth example embodiments. Moreover, the mobile device 600 needs only to be mounted with a component (such as a circuit) which emits a radio wave carrying the false signal. Further, the mobile device 600 needs only to operate only when emitting a radio wave carrying the false signal, and therefore, needs only to be mounted with a small battery. Therefore, the mobile device 600 can be achieved in a relatively small size, and can also be transported with ease. Accordingly, the mobile device 600 can be easily applied to the periphery of a building being a target to be protected.

Still further, the mobile body control system 3 according to the present example embodiment does not have to be limited to the configuration in FIGS. 20 and 21. In other words, the false signal generation unit 310, the second reception unit 760, and the storage unit 340 may be each included in the mobile device 600 rather than the second mobile body control device 700. In this case, information transmitted from the transmission unit 710 to the first reception unit 610 needs only to be information according to each configuration state.

Still further, when the position acquisition unit 630 of the mobile device 600 is capable of acquiring an absolute position of the mobile device 600 by use of a GPS or the like, the mobile body detection device 500 may be also included in the mobile device 600. In this case, portability of the overall mobile body control system 3 is improved.

Modification Example

A modification example of the mobile body control system 3 according to the present example embodiment is described. There is a case where, instead of autonomous flight performed while receiving a radio wave emitted from an artificial satellite 20 or the like, an opposing UAV 10 is remotely operated by a manipulator (controller side). Note that, a system combining persons or machine visions and automatically instructing about a flight direction, or the like is cited as the manipulator. Such a manipulator remotely operates the opposing UAV 10 according to a status of the opposing UAV 10. A signal (remote operation signal) indicating a command for remote operation by the manipulator is transmitted to the opposing UAV 10 from a controller or the like.

Furthermore, there is a case where the opposing UAV 10 includes a function of transmitting data acquired by a camera or various sensors mounted on the opposing UAV 10 to a controller side. Thereby, there may be a case where, even when the opposing UAV 10 cannot be seen from the manipulator, the manipulator can remotely operate the opposing UAV 10.

Furthermore, there is a case where the opposing UAV 10 uses flight by remote operation or autonomous flight according to circumstances. For example, there is a case where the opposing UAV 10 prioritizes flight by remote operation when the opposing UAV 10 can receive a remote operation signal from a controller (when the opposing UAV 10 is capable of remote operation), and the opposing UAV 10 moves to a previously designated point by autonomous flight when the remote operation signal is blocked.

Thus, in the present modification example, a method of also coping with a case where the opposing UAV 10 is remotely operated is described. Note that the present modification example is also applicable to the mobile body control system in each of the above-described first to fifth example embodiments.

In the present modification example, the false signal emission unit 320 further emits a jamming radio wave (second jamming radio wave) which jams a remote operation signal. A jamming radio wave is, for example, high-intensity noise. A remote operation signal used for remote operation is, for example, a signal on a predetermined frequency band such as a frequency band for hobby radio-controlled equipment (a 40 MHz band or a 72 MHz band in Japan), a frequency band for industrial radio-controlled equipment (a 73 MHz band), or a frequency band of an IEEE 802.11 standard (Wi-Fi (registered trademark), a 2.4 GHz band, or a 5 GHz band). Accordingly, the false signal emission unit 320 generates random noise for all the previously known frequency bands of radio waves. Thus, the false signal emission unit 320 can jam a remote operation signal.

The opposing UAV 10 receiving a jamming radio wave becomes unable to receive a remote operation signal. Therefore, the opposing UAV 10 attempts to remain where it is, start autonomous flight by a radio wave from an artificial satellite 20, or land. When starting autonomous flight by a radio wave from an artificial satellite 20, the opposing UAV 10 is appropriately eliminated as in the above-described first to fifth example embodiments because the false signal emission unit 320 emits a radio wave carrying the false signal.

Figure 22:
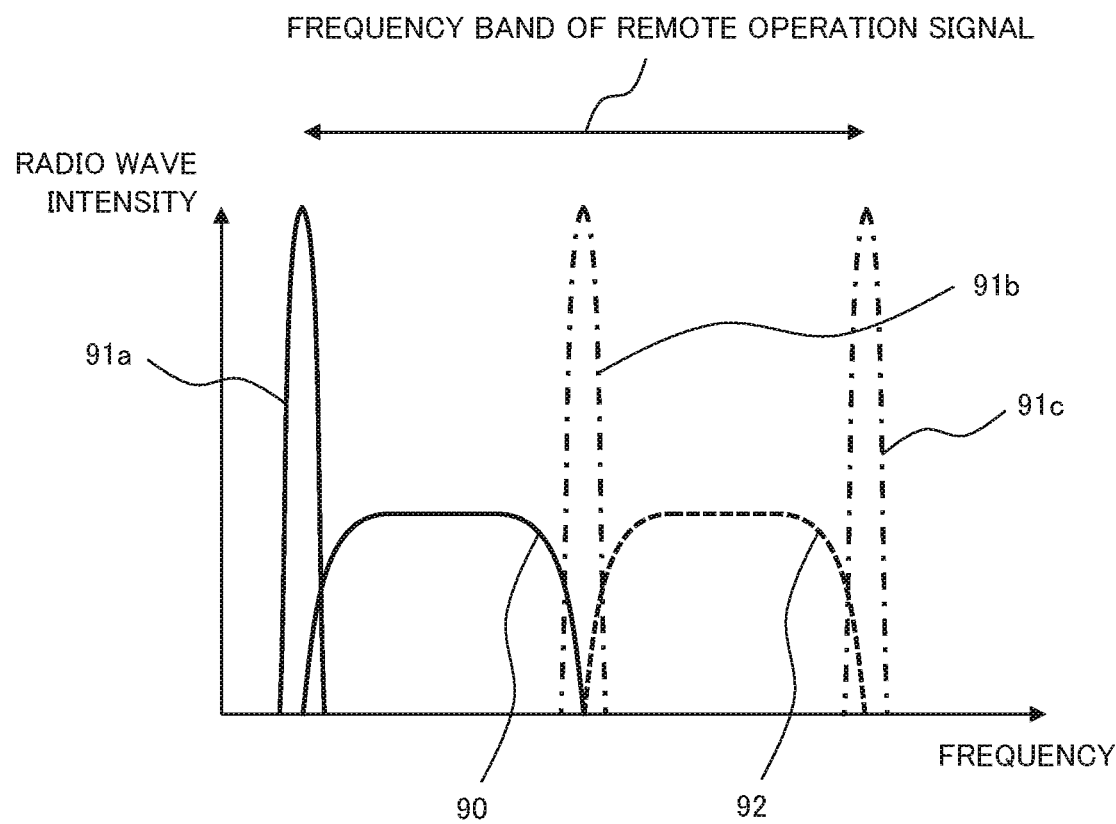
FIG. 22 is a diagram illustrating one example of a relation between a frequency of a remote operation signal and radio wave intensity.

Furthermore, a jamming radio wave does not necessarily have uniform intensity for all targeted frequency bands. FIG. 22 illustrates one example of a relation between a frequency of a remote operation signal and intensity of a radio wave (referred to as radio wave intensity). In FIG. 22, a horizontal axis indicates frequency, and a vertical axis indicates radio wave intensity. It is assumed that a frequency band of a remote operation signal is in a range indicated by both arrows. It is assumed that, in this range, for example, a remote operation signal 90 is an actually used remote operation signal, and a remote operation signal 92 indicated by a broken line is an operation signal cited as a candidate of a remote operation signal.

Since a frequency band of an actually used remote operation signal is not known, the false signal emission unit 320 emits a jamming radio wave at intensity higher than intensity of a remote operation signal and on an relatively narrow frequency band, for all frequency bands of a remote operation signal. For example, the false signal emission unit 320 emits a jamming radio wave 91a in FIG. 22. Then, the false signal emission unit 320 changes a frequency band of the jamming radio wave 91a, and emits the jamming radio wave 91a. In other words, the false signal emission unit 320 emits, for example, a jamming radio wave 91b, a jamming radio wave 91c, and the like.

A remote operation signal is segmented by emitting a jamming radio wave the frequency band of which is changed in this way. The opposing UAV 10 receiving a segmented remote operation signal is not able to restore an original signal, and is therefore not remotely operated by the remote operation signal.

Furthermore, the false signal emission unit 320 may observe an operation of the opposing UAV 10 while changing a frequency band of a jamming radio wave, and determine that a frequency band at a moment when the operation of the opposing UAV 10 differs from an operation so far is a frequency band used by a remote operation signal. Then, the false signal emission unit 320 may keep emitting a jamming radio wave on the frequency band at this moment.

In this way, the false signal emission unit 320 in the present example embodiment emits a jamming radio wave which jams a remote operation signal. Thus, even when the opposing UAV 10 is an instrument such as smartphone or a car navigation system operated by a person, based on a radio wave from an artificial satellite 20, the mobile body control system 3 in the present example embodiment can appropriately eliminate the opposing UAV 10.

The mobile body control system in each of the above-described example embodiments is also applicable to elimination of, for example, the opposing UAV 10 used in a crime, terrorism, or the like. Moreover, for example, for large-scale terrorism, an attack from another country, or the like, the mobile body control system 3 according to the sixth example embodiment may fly in a shorter time and include a simpler configuration than an offensive side (opposing UAV 10) flying a long distance and transporting a destructive substance (such as a bomb). Therefore, cost of a defense side (mobile device 600) is low. Thus, the mobile body control system 3 can be a potential offence deterrent power.

Seventh Example Embodiment

Figure 23:
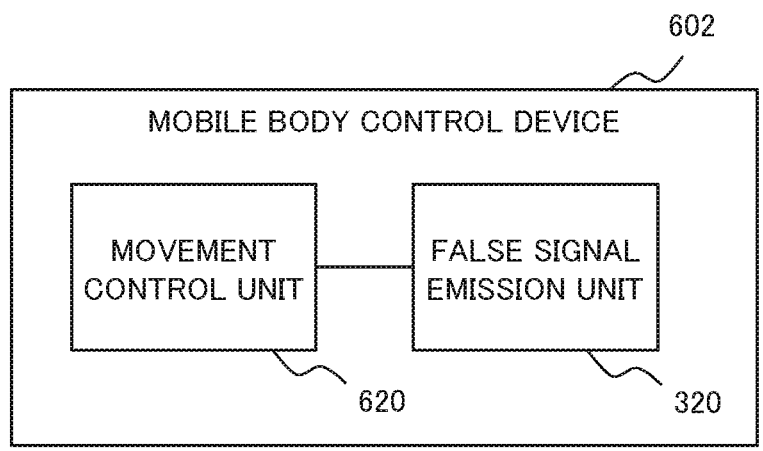
FIG. 23 is a functional block diagram illustrating one example of a functional configuration of a mobile body control device according to a seventh example embodiment.

A seventh example embodiment is described with reference to FIG. 23. A mobile body control device 602 in the present example embodiment is equivalent to the first mobile body control device 601 of the mobile device 600 in the above-described sixth example embodiment. In other words, the mobile body control device 602 includes a movement control unit 620 and a false signal emission unit 320. The movement control unit 620 moves in such a way as to be located within a predetermined range from an opposing UAV 10. This opposing UAV 10 is a mobile body which receives a radio wave carrying a signal for calculating its own (the opposing UAV 10) position. Moreover, the false signal emission unit 320 emits the false signal which is generated based on code information of the signal included in a radio wave received by the opposing UAV 10, and with which a position being different from the actual position of the opposing UAV 10 is calculated, into a region where the opposing UAV 10 can receive the false signal.

The opposing UAV 10 receiving a radio wave for calculating the position of the opposing UAV 10 from, for example, an artificial satellite or the like moves to a destination while calculating the position of the opposing UAV 10, based on the received radio wave. The movement control unit 620 provides control in such a way as to move its own UAV into, for example, a region where such the opposing UAV 10 can receive a radio wave carrying the false signal with which a position being different from the actual position is calculated. Then, the false signal emission unit 320 emits the radio wave carrying the false signal into a region where the opposing UAV 10 can receive the radio wave. Thus, the opposing UAV 10 can receive the radio wave carrying the false signal. As described above, the position being different from the actual position is calculated with this false signal, the opposing UAV 10 calculates its own (opposing UAV 10) position to be the above-described different position. Then, the opposing UAV 10 starts to move toward the destination, based on the calculated position, and therefore starts to move toward the position being different from an actual destination.

Thus, the mobile body control device 602 according to the present example embodiment can more appropriately eliminate the mobile body being the opposing UAV 10, similarly to the mobile body control system in each of the above-described example embodiments.

(Regarding Hardware Configuration)

Figure 24:
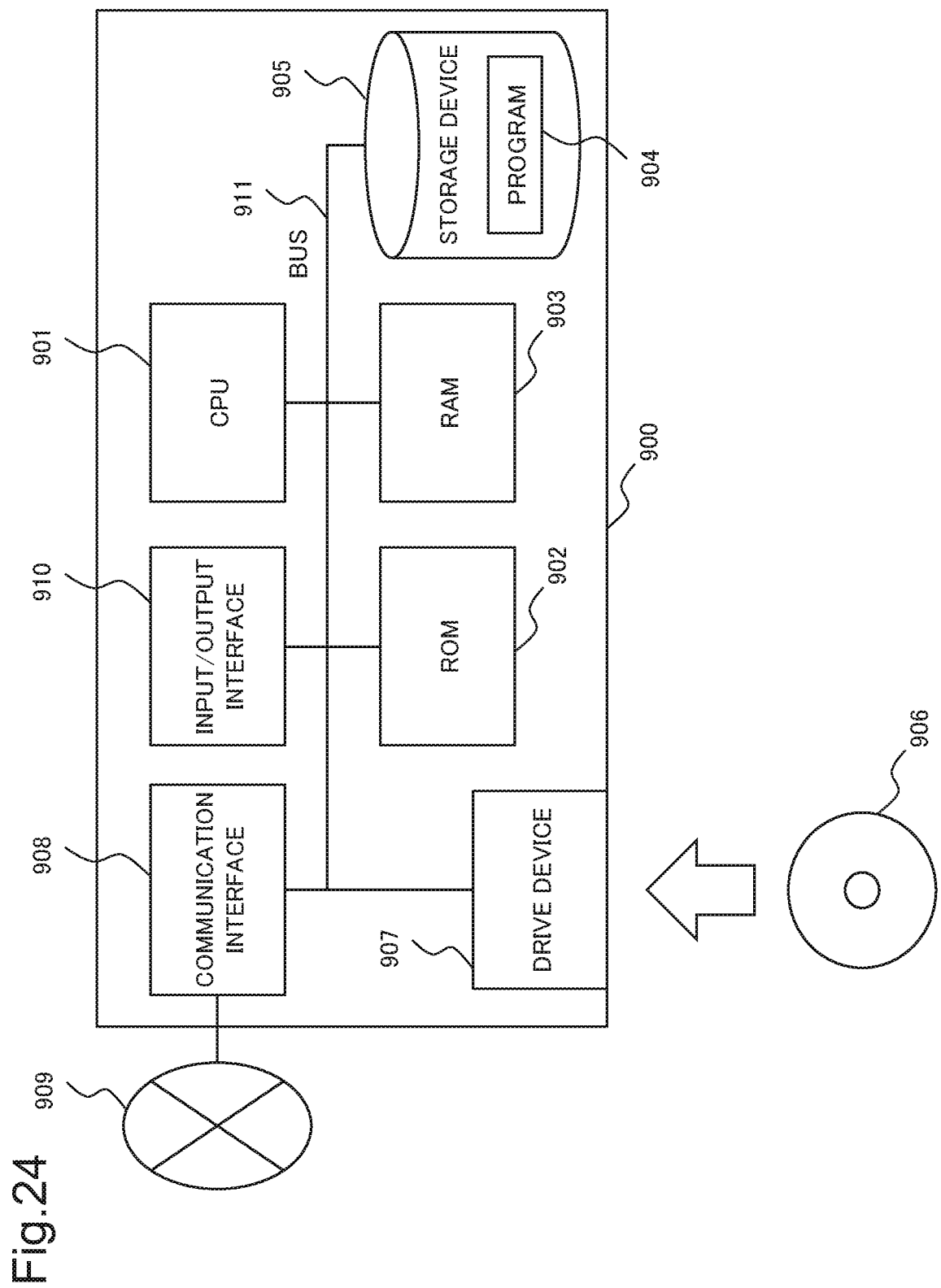
FIG. 24 is a diagram exemplarily illustrating a hardware configuration of a computer (information processing device) being capable of implementing each example embodiment of the present invention.

In each example embodiment of the present invention, each component of the mobile body control device, the mobile device, and the second mobile body control device indicates a block of a functional unit. Some or all of respective components of the mobile body control device, a mobile device, and a second mobile body control device are implemented by, for example, a given combination of an information processing device 900 and a program as illustrated in FIG. 24. FIG. 24 is a block diagram illustrating one example of a hardware configuration of the information processing device 900 implementing each component of each device. The information processing device 900 includes the following configuration as one example.

A central processing unit (CPU) 901
A read only memory (ROM) 902
A random access memory (RAM) 903
A program 904 loaded onto the RAM 903
A storage device 905 storing the program 904
A drive device 907 performing reading and writing in a recording medium 906
A communication interface 908 connected to a communication network 909
An input/output interface 910 inputting/outputting data
A bus 911 connecting each component Each component of the mobile body control device, a mobile device, and a second mobile body control device in each example embodiment is implemented by acquiring and then executing, by the CPU 901, the program 904 implementing each of these functions. The program 904 implementing the function of each component of the mobile body control device, a mobile device, and a second mobile body control device is previously stored in, for example, the storage device 905 or the RAM 903, and is read by the CPU 901 according to need. Note that, the program 904 may be supplied to the CPU 901 via the communication network 909, or may be previously stored in the recording medium 906, read by the drive device 907, and then supplied to the CPU 901.

There are various modification examples of a method of implementing the mobile body control device, a mobile device, and a second mobile body control device. For example, the mobile body control device, the mobile device, and the second mobile body control device may be each implemented by a given combination of an information processing device 900 differing from component to component and a program. Moreover, a plurality of components provided in the mobile body control device, a mobile device, and a second mobile body control device may be implemented by a given combination of one information processing device 900 and a program.

Furthermore, some or all of respective components of the mobile body control device, a mobile device, and a second mobile body control device are implemented by another general-purpose or dedicated circuit, a processor or the like, or a combination of these. These may be configured by a single chip, or may be configured by a plurality of chips connected via a bus.

Some or all of respective components of the mobile body control device, a mobile device, and a second mobile body control device may be implemented by a combination of the above-described circuit or the like and a program.

When some or all of respective components of the mobile body control device, a mobile device, and a second mobile body control device are implemented by a plurality of information processing devices, circuits, or the like, the plurality of information processing devices, circuits, or the like may be concentratedly arranged or distributedly arranged. For example, the information processing devices, circuits, or the like may be implemented as a form such as a client and server system, a cloud computing system, or the like in which each device, circuit, or the like is connected via a communication network.

Note that, each of the above-described example embodiments is a preferred example embodiment of the present invention, and the present invention is not limited to each of the above-described example embodiments only. A person skilled in the art can make a correction or substitution of each of the above-described example embodiments without departing from the spirit of the present invention, and construct a form in which various alterations are made.

Some or all of the above-described example embodiments may also be described as, but are not limited to, the following supplementary notes.

(Supplementary Note 1)

A mobile body control system comprising:

false signal generating means for generating, based on code information of a signal received by a mobile body in order to calculate a position of the mobile body, a false signal with which a position being different from an actual position of the mobile body is calculated; and false signal emission means for emitting the generated false signal into a predetermined region.

(Supplementary Note 2)

The mobile body control system according to supplementary note 1, wherein the false signal emission means is mounted to the mobile device moving in such a way as to be located within a predetermined range from the mobile body, and emits the false signal into a region where the mobile body can receive the false signal.

(Supplementary Note 3)

The mobile body control system according to supplementary note 2, wherein the mobile device acquires a position of the mobile device, and moves the mobile device, based on the acquired position of the mobile device.

(Supplementary Note 4)

The mobile body control system according to supplementary note 3, wherein the mobile device acquires a distance from the mobile body as the position of the mobile device.

(Supplementary Note 5)

The mobile body control system according to supplementary note 3 or 4, wherein the false signal emission means emits the false signal by changing intensity of the false signal according to at least one of an absolute position of the mobile device, a distance from the mobile body, and an altitude of the mobile device.

(Supplementary Note 6)

The mobile body control system according to any one of supplementary notes 1 to 5, wherein the false signal generating means generates the false signal with which a position symmetrical to the actual position of the mobile body with respect to a destination of the mobile body is calculated as the different position.

(Supplementary Note 7)

The mobile body control system according to any one of supplementary notes 1 to 5, wherein the false signal generating means generates the false signal with which a position of the destination of the mobile body is calculated as the different position.

(Supplementary Note 8)

The mobile body control system according to any one of supplementary notes 1 to 7, wherein the false signal emission means emits the false signal including directivity.

(Supplementary Note 9)

The mobile body control system according to any one of supplementary notes 1 to 8, further comprising controller for estimating the position and a movement direction of the mobile body, based on the actual position and the movement direction of the mobile body, and estimating a destination of the mobile body, based on the estimated movement direction and the actual position, wherein the false signal generating means generates the false signal, based on the actual position and the estimated destination of the mobile body.

(Supplementary Note 10)

The mobile body control system according to supplementary note 9, wherein the controller estimates, as a first movement direction, the movement direction of the mobile body before the false signal emission means emits the false signal, estimates, as a second movement direction, the movement direction of the mobile body after the false signal emission means emits the false signal, and estimates, as the destination of the mobile body, an intersection of a straight line passing the actual position of the mobile body before the false signal emission means emits the false signal and being parallel to the first movement direction, and a straight line passing the different position calculated by the false signal and being parallel to the second movement direction.

(Supplementary Note 11)

The mobile body control system according to supplementary note 9 or 10, wherein the false signal generating means generates the false signal with which the position to be calculated changes according to the actual position of the mobile body.

(Supplementary Note 12)

The mobile body control system according to any one of supplementary notes 1 to 5, wherein the false signal generating means generates, as the false signal, a jamming radio wave on a same frequency band as the signal received by the mobile body.

(Supplementary Note 13)

The mobile body control system according to any one of supplementary notes 1 to 12, further comprising a mobile body detection device which detects the mobile body, wherein the false signal emission means emits the false signal when the mobile body is detected.

(Supplementary Note 14)

The mobile body control system according to any one of supplementary notes 1 to 13, wherein the false signal emission means further emits a second jamming radio wave which jams a remote operation signal.

(Supplementary Note 15)

A mobile body control device comprising:

movement controller for moving in such a way as to be located within a predetermined range from a mobile body where the mobile body receives a signal serving to calculate a position of the mobile body; and false signal emission means for emitting a false signal which is generated based on code information of the signal received by the mobile body, and with which a position being different from an actual position of the mobile body is calculated, into a region where the mobile body can receive the false signal.

(Supplementary Note 16)

The mobile body control device according to supplementary note 15, further comprising position acquisition means for acquiring a position of the mobile body control device, wherein the movement controller moves the mobile body control device, based on the position of the mobile body control device being acquired by the position acquisition means.

(Supplementary Note 17)

The mobile body control device according to supplementary note 16, wherein the position acquisition means acquires a distance from the mobile body.

(Supplementary Note 18)

The mobile body control device according to supplementary note 16 or 17, wherein the position acquisition means acquires an altitude of the mobile body control device, and the false signal emission means emits the false signal by changing intensity of the false signal according to at least one of an absolute position of the mobile body control device, the distance from the mobile body, and the altitude of the mobile body control device which are acquired by the position acquisition means.

(Supplementary Note 19)

The mobile body control device according to any one of supplementary notes 15 to 18, wherein the false signal emission means further emits a second jamming radio wave which jams a remote operation signal.

(Supplementary Note 20)

A mobile body control method comprising:

generating, based on code information of a signal received by a mobile body in order to calculate a position of the mobile body, a false signal with which a position being different from an actual position of the mobile body is calculated; and emitting the generated false signal into a predetermined region.

(Supplementary Note 21)

A mobile body control method comprising:

moving in such a way as to be located within a predetermined range from a mobile body where the mobile body receives a signal serving to calculate a position of the mobile body; and emitting a false signal which is generated based on code information of the signal received by the mobile body, and with which a position being different from an actual position of the mobile body is calculated, into a region where the mobile body can receive the false signal.

(Supplementary Note 22)

A program which causes a computer to execute:

processing of generating, based on code information of a signal received by a mobile body in order to calculate a position of the mobile body, a false signal with which a position being different from an actual position of the mobile body is calculated; and processing of emitting the generated false signal into a predetermined region.

(Supplementary Note 23)

A program which causes a computer to execute:

processing of moving in such a way as to be located within a predetermined range from a mobile body where the mobile body receives a signal serving to calculate a position of the mobile body; and processing of emitting a false signal which is generated based on code information of the signal received by the mobile body, and with which a position being different from an actual position of the mobile body is calculated, into a region where the mobile body can receive the false signal.

(Supplementary Note 24)

A non-transitory recording medium recording a program which causes a computer to execute:

processing of generating, based on code information of a signal received by a mobile body in order to calculate a position of the mobile body, a false signal with which a position being different from an actual position of the mobile body is calculated; and processing of emitting the generated false signal into a predetermined region.

(Supplementary Note 25)

A non-transitory recording medium recording a program which causes a computer to execute:

processing of moving in such a way as to be located within a predetermined range from a mobile body where the mobile body receives a signal serving to calculate a position of the mobile body; and processing of emitting a false signal which is generated based on code information of the signal received by the mobile body, and with which a position being different from an actual position of the mobile body is calculated, into a region where the mobile body can receive the false signal.

The present invention has been described above with the above-described example embodiments as exemplary examples. However, the present invention is not limited to the above-described example embodiments. In other words, various aspects that may be understood by a person skilled in the art are applicable to the present invention within the scope of the present invention.

This application is based upon and claims the benefit of priority from Japanese Application (Japanese Patent Application No. 2017-007611), filed on Jan. 19, 2017, the disclosure of which is incorporated herein in its entirety by reference.

REFERENCE SIGNS LIST

1 Mobile body control system
2 Mobile body control system
3 Mobile body control system
10 Opposing UAV
11 False signal generation unit
12 False signal emission unit
20 Artificial satellite
100 Important facility
300 Mobile body control device
310 False signal generation unit
320 False signal emission unit
340 Storage unit
350 Input acceptance unit
360 Reception unit
400 Emission region
500 Mobile body detection device
600 Mobile device
601 First mobile body control device
602 Mobile body control device
610 First reception unit
620 Movement control unit
630 Position acquisition unit
700 Second mobile body control device
710 Transmission unit
760 Second reception unit
770 Second mobile body control unit

What is claimed is:

1. A mobile body control system comprising:
a false signal generator for generating, based on code information of a signal received by a mobile body in order to calculate a position of the mobile body, a false signal with which a position being different from an actual position of the mobile body is calculated; and
a false signal transmitter for emitting the false signal into a predetermined region, wherein
the false signal transmitter is mounted to a mobile device moving in such a way as to be located within a predetermined range from the mobile body, and emits the false signal into a region where the mobile body can receive the false signal, and
the false signal transmitter changes intensity of the false signal according to an altitude of the mobile device and emits the false signal with the changed intensity.

2. The mobile body control system according to claim 1, wherein the mobile device acquires a position of the mobile device, and moves the mobile device, based on the acquired position of the mobile device.

3. The mobile body control system according to claim 2, wherein the mobile device acquires a distance from the mobile body as the position of the mobile device.

4. The mobile body control system according to claim 2, wherein the false signal transmitter changes the intensity of the false signal according to the altitude and at least one of an absolute position of the mobile device and a distance from the mobile body to the mobile device.

5. The mobile body control system according to claim 1, wherein the false signal generator generates the false signal with which a position symmetrical to the actual position of the mobile body with respect to a destination of the mobile body is calculated as the different position.

6. The mobile body control system according to claim 1, wherein the false signal generator generates the false signal with which a position of the destination of the mobile body is calculated as the different position.

7. The mobile body control system according to claim 1, wherein the false signal transmitter emits the false signal including directivity.

8. The mobile body control system according to claim 1, further comprising
a controller for estimating the position and a movement direction of the mobile body, based on the actual position and the movement direction of the mobile body, and estimating a destination of the mobile body, based on the estimated movement direction and the actual position, wherein
the false signal generator generates the false signal, based on the actual position and the estimated destination of the mobile body.

9. The mobile body control system according to claim 8, wherein the controller estimates, as a first movement direction, the movement direction of the mobile body before the false signal transmitter emits the false signal, estimates, as a second movement direction, the movement direction of the mobile body after the false signal transmitter emits the false signal, and estimates, as the destination of the mobile body, an intersection of a straight line passing the actual position of the mobile body before the false signal transmitter emits the false signal and being parallel to the first movement direction, and a straight line passing the different position calculated by the false signal and being parallel to the second movement direction.

10. The mobile body control system according to claim 8, wherein the false signal generator generates the false signal with which the position to be calculated changes according to the actual position of the mobile body.

11. The mobile body control system according to claim 1, wherein the false signal generator generates, as the false signal, a jamming radio wave on a same frequency band as the signal received by the mobile body.

12. The mobile body control system according to claim 1, further comprising a mobile body detection device which detects the mobile body, wherein
the false signal transmitter emits the false signal when the mobile body is detected.

13. The mobile body control system according to claim 1, wherein the false signal transmitter further emits a second jamming radio wave which jams a remote operation signal.

14. A mobile body control method comprising:
generating, based on code information of a signal received by a mobile body in order to calculate a position of the mobile body, a false signal with which a position being different from an actual position of the mobile body is calculated;
changing intensity of the false signal according to an altitude of a mobile device moving in such a way as to be located within a predetermined range from the mobile body; and
by the mobile device, emitting the false signal with the changed intensity into a predetermined region where the mobile body can receive the false signal.

15. A non-transitory computer-readable recording medium storing instructions that cause a processor to execute the steps of:
generating, based on code information of a signal received by a mobile body in order to calculate a position of the mobile body, a false signal with which a position being different from an actual position of the mobile body is calculated;
changing intensity of the false signal according to an altitude of a mobile device moving in such a way as to be located within a predetermined range from the mobile body; and
causing the mobile device to emit the false signal with the changed intensity into a predetermined region where the mobile body can receive the false signal.

* * * * *